(12) United States Patent
Lin et al.

(10) Patent No.: US 11,864,701 B2
(45) Date of Patent: Jan. 9, 2024

(54) WATER TANK ASSEMBLY, PUMPING AND DRAINAGE SYSTEM, REVERSING VALVE, BASE STATION BODY, BASE STATION, AND CLEANING SYSTEM

(71) Applicants: YUNJING INTELLIGENCE TECHNOLOGY (DONGGUAN) CO., LTD., Dongguan (CN); YUNJING INTELLIGENCE (SHENZHEN) CO., LTD., Shenzhen (CN)

(72) Inventors: Xiaolong Lin, Shenzhen (CN); Churui Xu, Shenzhen (CN); Jin Chen, Shenzhen (CN); Weijie Zhu, Shenzhen (CN); Zhenxu Wang, Shenzhen (CN)

(73) Assignees: YUNJING INTELLIGENCE INNOVATION (SHENZHEN) CO., LTD., Shenzhen (CN); YUNJING INTELLIGENCE (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 18/070,477

(22) Filed: Nov. 29, 2022

(65) Prior Publication Data

US 2023/0086402 A1 Mar. 23, 2023

Related U.S. Application Data

(63) Continuation of application No. PCT/CN2022/092878, filed on May 13, 2022.

(30) Foreign Application Priority Data

Aug. 3, 2021 (CN) .......................... 202110889012.4
Aug. 3, 2021 (CN) .......................... 202121799137.X (Continued)

(51) Int. Cl.
*A47L 11/40* (2006.01)
*B08B 3/02* (2006.01)

(52) U.S. Cl.
CPC ............ *A47L 11/4091* (2013.01); *B08B 3/02* (2013.01); *A47L 2201/028* (2013.01); *B08B 2203/027* (2013.01)

(58) Field of Classification Search
CPC .. A47L 11/4091; B08B 3/02; B08B 2203/027
See application file for complete search history.

(56) References Cited

U.S. PATENT DOCUMENTS

| 4,720,246 A | 1/1988 | Morton |
| 11,348,269 B1 * | 5/2022 | Ebrahimi Afrouzi ... G01S 17/89 |

(Continued)

FOREIGN PATENT DOCUMENTS

| CN | 205001564 U | 1/2016 |
| CN | 106641380 A | 5/2017 |

(Continued)

OTHER PUBLICATIONS

European Search Report issued in EP application No. 22797616.4, dated Oct. 20, 2023.

(Continued)

*Primary Examiner* — Jason K Niesz

(57) ABSTRACT

A water tank assembly including a tank body and a one-way valve is provided. The tank body is defined with a clean water cavity communicated with an external pipeline through a water inlet channel, the external pipeline is capable of transporting water to the clean water cavity. The one-way valve is arranged in the water inlet channel and has a first and a second state. During delivering clean water to the clean water cavity, the one-way valve is in the first state to allow water in the external pipeline to be delivered to the clean water cavity, and when clean water is stopped to (Continued)

supply to the clean water cavity, the one-way valve is changed to the second state to restrict the water in the water inlet channel flowing out, such that outflow of the clean water from the water inlet channel is blocked when the external pipeline is removed.

20 Claims, 30 Drawing Sheets

(30) Foreign Application Priority Data

Aug. 3, 2021 (CN) .......................... 202121799561.4
Aug. 3, 2021 (CN) .......................... 202121799562.9

(56) References Cited

U.S. PATENT DOCUMENTS

| | | | |
|---|---|---|---|
| 11,348,289 B2 | 5/2022 | Ali et al. | |
| 2022/0022718 A1* | 1/2022 | Wu | ..................... A47L 11/4005 |

FOREIGN PATENT DOCUMENTS

| | | |
|---|---|---|
| CN | 109319156 A | 2/2019 |
| CN | 111743475 A | 10/2020 |
| CN | 212281227 U | 1/2021 |
| CN | 112568801 A | 3/2021 |
| DE | 202016104067 U1 | 10/2017 |
| EP | 1762185 A2 | 3/2007 |
| EP | 1762165 A3 | 2/2012 |
| EP | 3542695 A1 | 9/2019 |
| WO | 2016037559 A1 | 3/2016 |
| WO | 2023051804 A1 | 4/2023 |

OTHER PUBLICATIONS

European Search Report issued in EP application No. 22216922.9, dated Jun. 30, 2023.
United States Non Final OA issued in U.S. Appl. No. 18/098,705, dated Aug. 24, 2023.

* cited by examiner

WATER TANK ASSEMBLY, PUMPING AND DRAINAGE SYSTEM, REVERSING VALVE, BASE STATION BODY, BASE STATION, AND CLEANING SYSTEM

TECHNICAL FIELD

The present disclosure relates to technical field of cleaning apparatus.

BACKGROUND

Recently, more and more cleaning apparatus have entered people's lives. In order to facilitate the use of the cleaning apparatus, base station has been provided to service the cleaning apparatus, and has increasingly become an inseparable supporting device for the cleaning apparatus. The base station generally includes a clean water tank having a clean water cavity for outputting clean water, and a sewage tank having a sewage cavity for receiving sewage. In order to be more convenient for users, the inventors have invented a base station that can automatically feed clean water to the clean water tank by connecting a water inlet pipe of the clean water tank to an external pipeline during the base station is in use.

However, the cleaning apparatus mentioned above has the defects: water in the water inlet channel of the clean water tank is prone to leak from the water inlet channel at the time the external pipeline is removed.

SUMMARY

An object of the present disclosure is to provide a water tank assembly which can block water in the water inlet channel from flowing back.

A first aspect of the embodiments of the present disclosure provides a water tank assembly which is configured to be installed on a base station, and the water tank assembly comprises:

a tank body defined with a clean water cavity, the clean water cavity is communicated with an external pipeline through a water inlet channel, the external pipeline is capable of transporting clean water into the clean water cavity; and a one-way valve arranged in the water inlet channel, the one-way valve has a first state and a second state, when the one-way valve is in the first state, water in the external pipeline is allowed to flow to the clean water cavity; when the one-way valve is in the second state, water in the clean water cavity is restricted to flow out along the water inlet channel.

The water tank assembly of the present disclosure, during delivering clean water to the clean water cavity, the one-way valve is in the first state to allow water in the external pipeline to be delivered to the clean water cavity, and when delivery of clean water to the clean water cavity is stopped, the one-way valve can be changed to the second state to restrict the water in the clean water cavity flowing out along the water inlet channel, such that outflow of the clean water from the clean water cavity can be blocked when the external pipeline is removed.

A second aspect of the embodiments of the present disclosure provides a base station for servicing a cleaning apparatus. The base station comprises a base station body and the water tank assembly as described above, the base station body is provided with a cleaning system, and the clean water cavity is configured to supply clean water to the cleaning system.

A third aspect of the embodiments of the present disclosure provides a water tank assembly which is configured to be installed on a base station, and the water tank assembly comprises:

a tank body defined with a sewage cavity, the tank body is provided with a water inlet channel and a sewage discharging channel both communicating with the sewage cavity;

the sewage cavity is configured to receive the sewage coming through the water inlet channel under a negative pressure inside the sewage cavity introduced by an external air source, and is configured to discharge the sewage through the sewage discharging channel under a positive pressure inside the sewage cavity introduced by the external air source; and a one-way valve arranged in the water inlet channel, when the sewage cavity is in a positive pressure state, the one-way valve is in a closed state, and when the sewage cavity is in a negative pressure state, the one-way valve is in an open state.

As the water tank assembly of the present disclosure being used, when external air source applies negative pressure to the sewage cavity, the one-way valve is in an open state, so that sewage can be sucked into the sewage cavity through the water inlet channel. When sewage in the sewage cavity needs to be discharged, the external air source applies positive pressure to the sewage cavity, so that the sewage can be discharged through the sewage discharging channel; and the one-way valve is closed, which can block outflow of the gas in the sewage cavity from the one-way valve in the water inlet channel, so that sewage in the sewage cavity is capable of being discharged from the sewage discharging channel under the positive pressure. In addition, the arrangement of the one-way valve can also block the sewage flowing back from the water inlet channel under the positive pressure.

A fourth aspect of the embodiments of the present disclosure provides a base station which is configured for servicing a cleaning apparatus. The base station comprises a base station body and the water tank assembly as described above, the base station body is provided with a cleaning system, and the sewage cavity is configured to receive sewage produced by the cleaning system.

A fifth aspect of the embodiments of the present disclosure provides a base station body which is configured to be installed with a first water tank or a second water tank. A reversing valve is arranged in the first water tank, an air pump is mounted in the base station body, wherein the base station body comprises:

a negative pressure interface, configured to communicate with an air inlet of the air pump;

a positive pressure interface, configured to dock with the first water tank, the positive pressure interface is provided with a gas inlet that communicates with an air outlet of the air pump and a docking port for docking with the first water tank, and the gas inlet communicates with the docking port;

when the first water tank is installed on the base station body, the negative pressure interface is communicated with the first water tank, and the docking port of the positive pressure interface is in an open state to connect and communicate with the first water tank;

when the second water tank is installed on the base station body, the negative pressure interface is communicated with the second water tank, and the positive pressure interface is communicated to the atmosphere.

In some embodiments, when the second water tank is installed on the base station body, the docking port of the positive pressure interface is in a closed state.

In some embodiments, the positive pressure interface is defined with an exhaust port communicated with the gas inlet; when the first water tank is installed on the base station body, the exhaust port is in a closed state, and gas from the gas pump enters the first water tank through the gas inlet, the docking port, and the reversing valve; when the second water tank is installed on the base station body, gas from the gas pump is discharged to the atmosphere through the gas inlet and the exhaust port.

In some embodiments, the positive pressure interface further comprises a concave portion defined on the base station body, and the concave portion defines a communicating cavity; the communicating cavity is configured to communicate with the gas inlet, the docking port, and the exhaust port respectively; in case the second water tank is installed on the base station body, gas from the gas pump first enters the communicating cavity from the gas inlet, and then is discharged into the atmosphere through the exhaust port.

In some embodiments, the maximum cross-sectional area of a gas channel of the gas inlet is smaller than the maximum cross-sectional area of a gas channel of the communicating cavity, and the maximum cross-sectional area of the gas channel of the communicating cavity is larger than the maximum cross-sectional area of a gas channel of the exhaust port.

In some embodiments, the docking port is a concave docking port, the first water tank comprises a protruding gas inlet connector, and the gas inlet connector is capable of being inserted into the concave docking port to communicate with the concave docking port; or the docking port is a convex docking port, the convex docking port is located in the concave portion, and protrudes upwards from a bottom of the concave portion, the first water tank comprises a convex gas inlet connector, and the convex docking port is capable of being inserted into the gas inlet connector to communicate with the gas inlet connector.

In some embodiments, the base station body is further provided with a sealing member, and the sealing member is positioned between the docking port and the gas inlet connector.

In some embodiments, in case the docking port is a concave docking port, the sealing member is sleeved on an outer peripheral wall of the gas inlet connector, and abuts an inner side wall of the concave docking port; in case the docking port is a convex docking port, the sealing member is arranged on an inner peripheral wall of the gas inlet connector, and abuts an outer side wall of the convex docking port.

In some embodiments, in case the docking port is a concave docking port, the sealing member is provided with annular protrusions protruded on an outer peripheral wall of the sealing member, and the annular protrusions resist against the inner side wall of the concave docking port; in case the docking port is a convex docking port, the sealing member is provided with annular protrusions protruded on an inner peripheral wall of the sealing member, and the annular protrusions resist against the outer side wall of the convex docking port.

In some embodiments, the docking port is a concave docking port, the sealing member is defined with an extending portion; the extending portion is located at an end of the sealing member facing the concave docking port, a deformation cavity is defined between the extending portion and the inner side wall of the concave docking port, and the extending portion deforms towards the deformation cavity when there is gas passing through.

In some embodiments, the base station body further comprises a covering member, the covering member is movably or detachably connected to the docking port to close or open the docking port.

In some embodiments, the covering member is configured to be installed at an opening of the concave portion, to block outflow of gas from the docking port and allow gas from the gas inlet to pass through the communicating cavity and then to be discharged from the exhaust port.

In some embodiments, the covering member comprises a rigid member and/or an elastic plug.

A sixth aspect of the embodiments of the present disclosure provides a base station which comprises a first water tank or a second water tank, and the base station body as described above; the base station body is configured to be installed with the first water tank or the second water tank.

A seventh aspect of the embodiments of the present disclosure provides a cleaning system which comprises the base station as described above and a cleaning apparatus. The base station is configured for servicing the cleaning apparatus.

The base station body, the base station, and the cleaning system of the present disclosure are compatible with two kinds of water tanks for gas injection and gas extraction.

An eighth aspect of the embodiments of the present disclosure provides a pumping and drainage system which comprises:

a first water tank, the first water tank is defined with a water storage cavity and a vent communicated with the water storage cavity;

an gas source system communicated with the vent;

in case the gas source system is in a first state, air in the water storage cavity is discharged through the vent and the gas source system successively, causing the water storage cavity to be in a negative pressure state, allowing fluid to be inhaled to the water storage cavity; in case the gas source system is in a second state, air is delivered to the water storage cavity by the gas source system through the vent, causing the water storage cavity to be in a positive pressure state, allowing the fluid in the water storage cavity to be discharged.

The pumping and drainage system of the present disclosure, gas in the water storage cavity is outputted through the vent of the first water tank by the gas source system, or gas is inputted into the water storage cavity through the vent of the first water tank by the gas source system. Specifically, when the gas source system is in the first state, gas in the water storage cavity is discharged through the vent and the gas source system successively, causing the water storage cavity to be in a negative pressure state, thus water can be sucked into the water storage cavity of the first water tank; when the air source system is in the second state, gas is transported into the water storage cavity through the vent by the gas source system, causing the water storage cavity to be in a positive pressure state, thus water in the water storage cavity of the first water tank can be discharged. The base station provided with the pumping and drainage system can realize automatic collection of fluid to the water tank and automatic discharge of fluid through the gas source system without manpower participation, which is easy to use, high intelligence, and is capable of improving the user experience. In addition, since it can be realized through the gas source system, the whole structure is relatively simple, and the fluid does not pass through a power device, which reduces the risk of damaging the power device and improves the service life of the device.

A ninth aspect of the embodiments of the present disclosure provides a base station which comprises a base station body and the pumping and drainage system as described above. Wherein, the first water tank is installed on the base station body.

A tenth aspect of the embodiments of the present disclosure provides a cleaning system which comprises the base station as described above and a cleaning apparatus.

An eleventh aspect of the embodiments of the present disclosure provides a reversing valve which comprises:
 a housing, a surface of the hosing is defined with at least four gas holes;
 a reversing member movably arranged in the housing, the reversing member is defined with at least two independent channels, and each channel communicates with two of the gas holes; and
 a driving member arranged on the housing and in driving connection with the reversing member, the driving member drives the reversing member to move to switch the communication between the channels and different gas holes.

The reversing valve of the present disclosure, the reversing member is driven by the driving member to move, so that the channels on the reversing member can be switched to communicate with different gas holes on the surface of the housing, realizing the switching of the gas circuits. When the reversing valve is applied to a base station of a cleaning system, the positive pressure gas inlet pipe, the vent pipe, the negative pressure gas outlet pipe, and the exhaust pipe, which consist the gas pipeline for the water tank, all has one end connected to a different one of the four different gas holes of the reversing valve, and the other end of the positive pressure air inlet pipe is configured for gas inputting, the other end of the vent pipe is connected to the water tank, the other end of the negative pressure suction pipe is configured for gas outputting, and the other end of the exhaust pipe is communicated to the atmospheric environment. The gas circuits are switchable by the reversing valve, when the negative pressure suction pipe is communicated with the vent pipe and the positive pressure air inlet pipe is communicated with the exhaust pipe, a negative pressure is formed inside the water tank, so that water is capable of being inputted to the water tank; when the positive pressure air inlet pipe is communicated with the vent pipe and the negative pressure suction pipe is communicated with the exhaust pipe, a positive pressure is formed inside the water tank, so that water can be discharged from the water tank. A single valve can solve the problems solved by the existing two two-position three-way solenoid valves, which reduces the number of the valve and the cost. Further, the reversing valve only needs to connect the positive pressure air inlet pipe, the vent pipe, the negative pressure suction pipe and the exhaust pipe, so that the number of pipes of the pipeline is reduced, the arrangement of the pipeline becomes simple and misfitting will be reduced, and the cost is further reduced.

A twelfth aspect of the embodiments of the present disclosure provides a base station, wherein the base station comprises a base station body and the reversing valve as described above, the base station body is provided with a water tank and a pump body, and the water tank has a vent port and a water guiding port;
 the reversing member comprises a first channel and a second channel, and the housing has a first gas hole communicated with an output end of the pump body, a second gas hole communicated with an input end of the pump body, a third gas hole communicated with the vent port, and a fourth gas hole communicated to the atmospheric environment;
 in case the first channel, the first gas hole, and the fourth gas hole are communicated, and the second channel, the second gas hole, and the third gas hole are communicated, a negative pressure is formed inside the water tank, allowing water to be stored in the water tank through the water guiding port;
 in case the first channel, the first gas hole, and the third gas hole are communicated, and the second channel, the second gas hole, and the fourth gas hole are communicated, a positive pressure is formed inside the water tank, allowing water to be discharged from the water tank through the water guiding port.

A thirteenth aspect of the embodiments of the present disclosure provides a cleaning system which comprises the base station as described above and a cleaning apparatus.

BRIEF DESCRIPTION OF THE DRAWINGS

FIG. 15b is an enlarged view of portion A in FIG. 15a;

FIG. 16b is an enlarged view of portion B in FIG. 16a;

DETAILED DESCRIPTION

In order to explain the technical content, construction features, the purpose and effect achieved by the present disclosure, the following is described in detail combined with the embodiments and the attached drawings.

As shown in FIG. 1 to FIG. 10, the present disclosure provides a base station configured for servicing cleaning apparatus, such as, for cleaning the cleaning apparatus, replenishing water for the cleaning apparatus which is equipped with a clean water tank, and/or, discharging sewage of the cleaning apparatus which is equipped with a sewage tank. The cleaning apparatus may include a cleaning robot that can move automatically, or a handheld cleaning apparatus that can be hand-held and driven by users, such as a hand-held cleaning device, etc.

The base station may include a base station body 210 and a water tank assembly 102. In some embodiments, a cleaning system X may be provided on the base station body 210. The cleaning system X is configured to transport clean water required by the base station for cleaning mopping members of the cleaning robot. In some embodiments, the cleaning system may be configured to suck sewage produced during the base station cleaning the mopping members of the cleaning robot.

Figure 1:
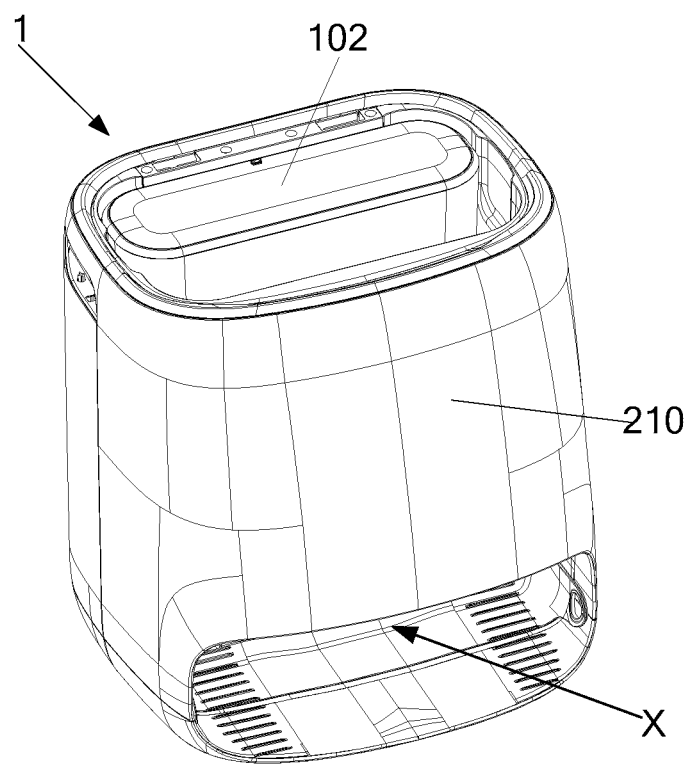
FIG. 1 is a perspective diagram of a base station according to an exemplary embodiment of the present disclosure.
Figure 2:
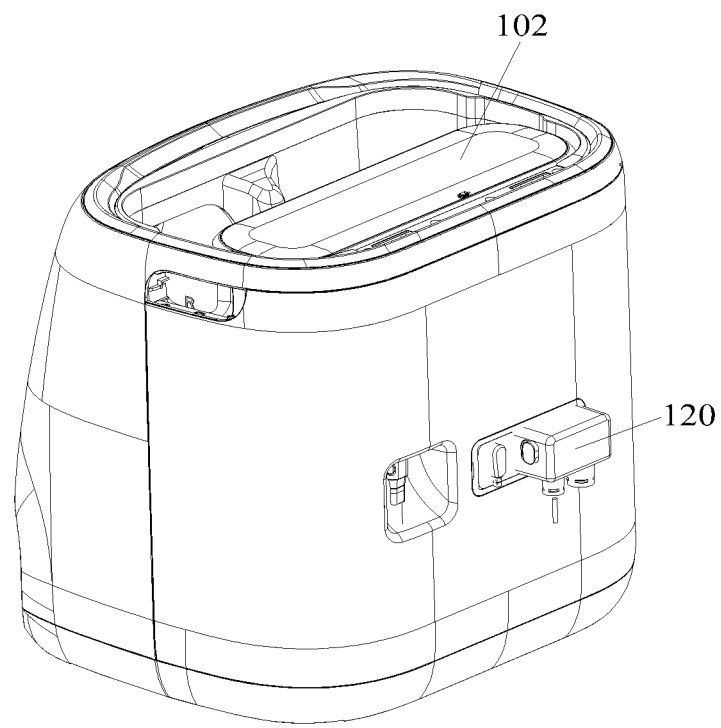
FIG. 2 is a perspective diagram of the base station from another angle according to an exemplary embodiment of the present disclosure.
Figure 3:
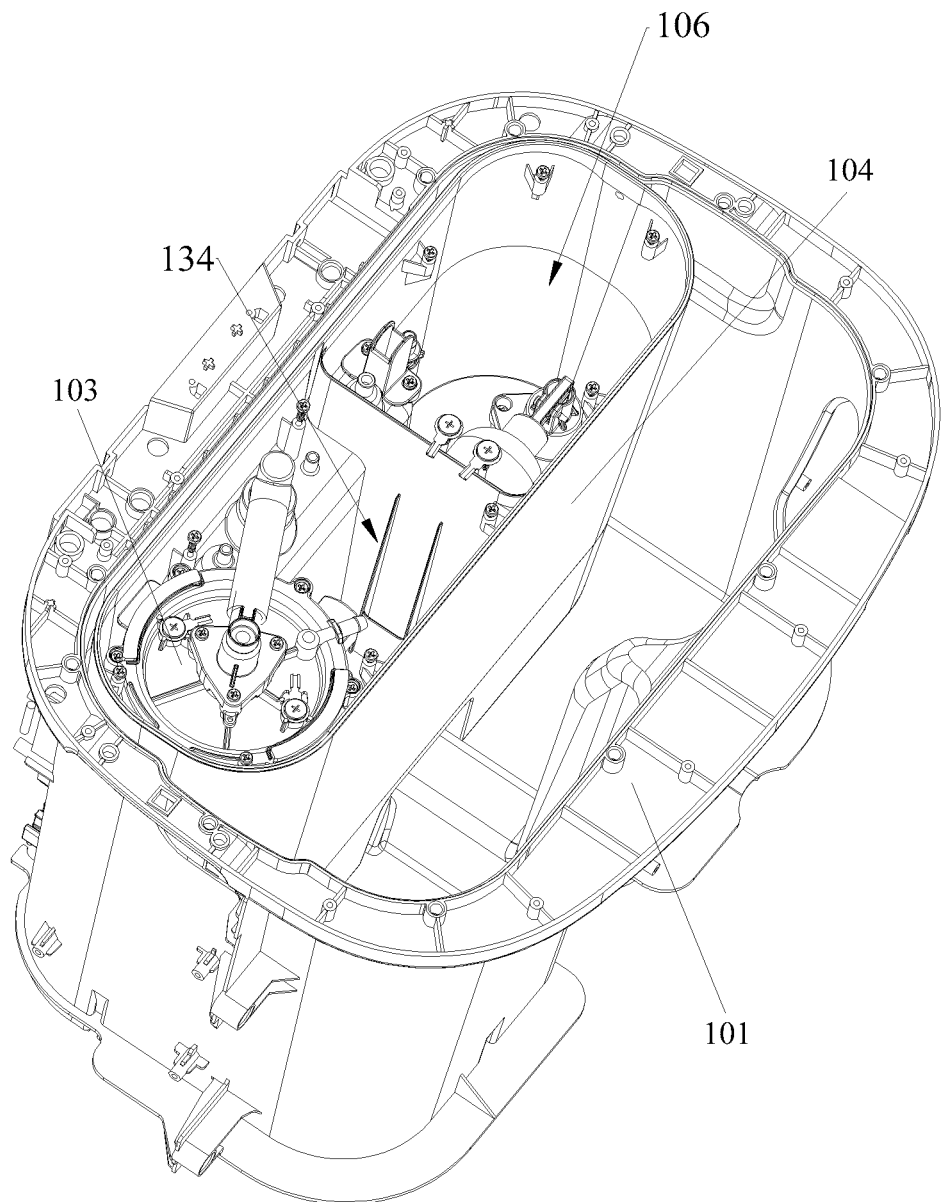
FIG. 3 is a perspective diagram of a base station bracket and a water tank assembly according to an exemplary embodiment of the present disclosure.

In some embodiments, as shown in FIG. 3, the water tank assembly 102 may be installed on a base station bracket 101 of the base station body 210.

The water tank assembly 102 includes a tank body 104 in which a clean water cavity 106 is defined. In some embodiments, the cleaning system X may communicate with the clean water cavity 106, such that clean water in the clean water cavity 106 can be provided to the cleaning system X. In some other embodiments, when the cleaning apparatus equipped with the clean water tank is docked to the base station, the clean water cavity 106 of the base station can communicate with the clean water tank of the cleaning apparatus, so that clean water in the clean water cavity 106 can be supplied to the cleaning apparatus.

Referring to FIGS. 4 to 6 and FIG. 10, the clean water cavity 106 is communicated with an external pipeline 152 through a water inlet channel 107. The external pipeline 152 is capable of transporting clean water into the clean water cavity 106. The water inlet channel 107 is provided with a one-way valve 114 having a first state and a second state. In case the one-way valve 114 is in the first state, the water in the external pipeline 152 is allowed to flow towards the clean water cavity 106; in case the one-way valve 114 is in the second state, the water is restricted to flow out from the water inlet channel 107.

In the water tank assembly 102 of the present disclosure, when the external pipeline 152 supplies clean water to the clean water cavity 106, the one-way valve 114 is in the first state, so that water from the external pipeline 152 is capable of being supplied to the clean water cavity 106; and the one-way valve 114 is in the second state when supply of clean water to the clean water cavity 106 is stopped, which can restrict the water in the water inlet channel 107 flowing out, thus the clean water in the water inlet channel 107 can be obstructed from flowing out when the external pipeline 152 is removed.

In some embodiments, the first state may be an open state. Under the pressure of the water flowing from the water inlet channel 107 towards the clean water cavity 106, the one-way valve 114 is in an open state to allow water from the external pipeline 152 to be supplied to the clean water cavity 106.

The second state may be a closed state, or a slightly open state (there may be a small gap). In case there is fluid in the clean water cavity 106 and the external pipeline 152 stops supplying clean water to the clean water cavity 106, the water pressure in the clean water cavity 106 is greater than the water pressure at the water inlet channel 107, which gives the one-way valve 114 an resistance that prevents the one-way valve 114 from further opening, making the one-way valve 114 be in a closed or nearly closed state, thus clean water in the clean water cavity 106 is obstructed from flowing out.

In an exemplary embodiment of the present disclosure, a water outlet end of the one-way valve 114 may include an elastic structure, and the elastic structure enables the opening of the water outlet end to be closed or nearly closed under a preset water pressure or air pressure. Illustratively, the one-way valve 114 may be a duckbill valve.

It should be noted that the description of "flowing out" in the embodiments of the present disclosure means that water in the clean water cavity 106 flows in the direction of the external pipeline 152 along the water inlet channel 107, to the outside of the cleaning base station.

It should be understood that the water inlet channel 107 can be formed on the tank body 104, or formed on the pipeline connected to the tank body 104, or partially formed on the tank body 104 and partially formed on the pipeline connected to the tank body 104.

Figure 5:
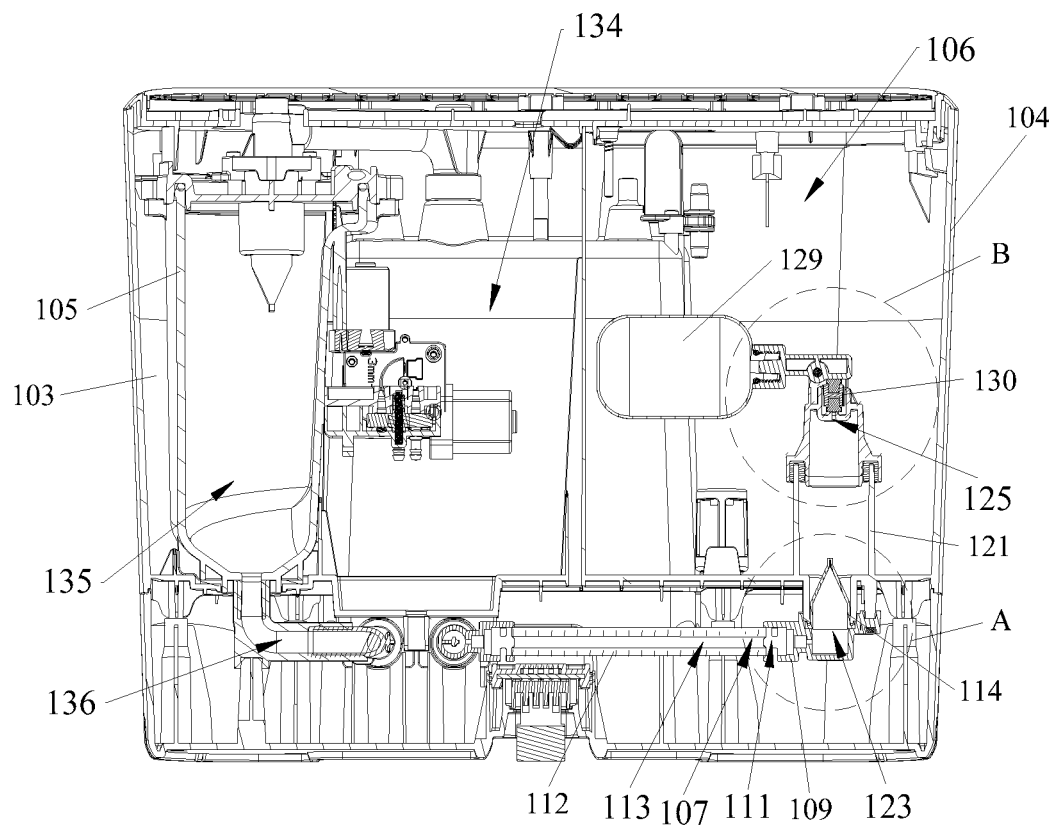
FIG. 5 is a cross-sectional view of a water tank assembly according to an exemplary embodiment of the present disclosure.
Figure 6:
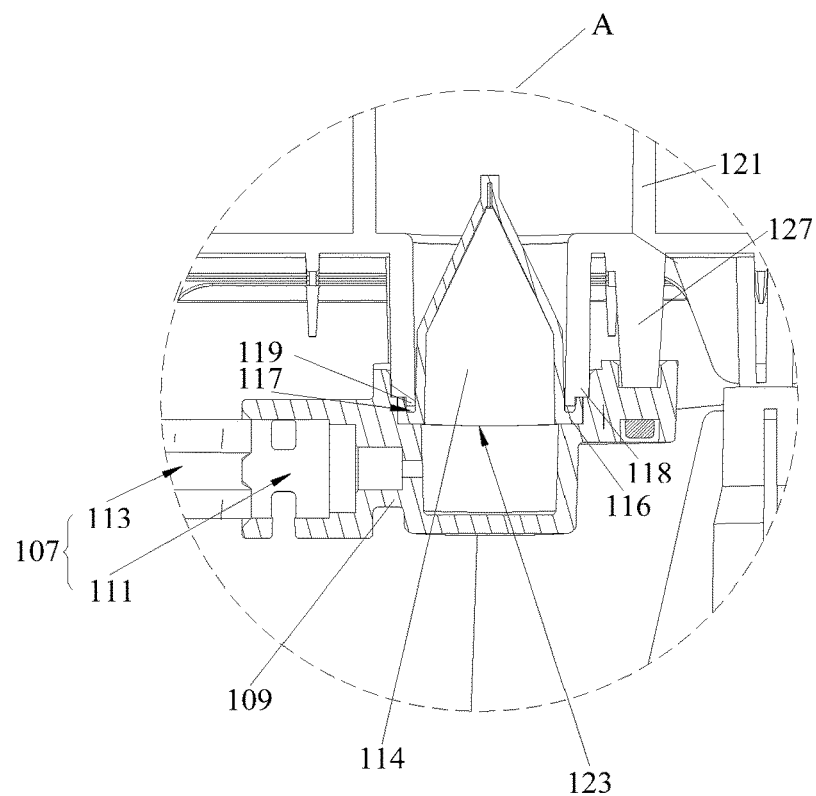
FIG. 6 is an enlarged view of portion A in FIG. 5.

In some embodiments, as shown in FIGS. 5 and 6, the one-way valve 114 may be a duckbill valve that includes a retractable opening for allowing the water from the external pipeline 152 flowing through and for restricting the water from the clean water cavity 106 flowing out. In case water from the external pipeline 152 flows towards the clean water cavity 106, the opening of the duckbill valve opens under the pressure of the water flowing towards the clean water cavity 106, thereby water can flow into the clean water cavity 106; in case water from the external pipeline 152 stops flowing towards the clean water cavity 106, the opening of the duckbill valve can correspondingly contract to a nearly closed state due to its own retractable characteristics, thereby water is restricted to flow out. In particular, the fluid in the clean water cavity 106 can also gives the duckbill valve a resistance that obstructs the duckbill valve from opening further, which improves the reliability of the duckbill valve restricting the water from flowing out. For example, under normal conditions, the duckbill valve is capable of staying at a slightly open state (the second state) to restrict water back-flow, and will change to the open state (the first state) under water pressure when water from the external pipeline 152 flows towards the clean water cavity 106 through the water inlet channel 107. When supply of water to the clean water cavity 106 is stopped, the duckbill valve will return to the slightly open state from the open state. Of course, in some other embodiments, the duckbill valve can also be in a closed state under normal conditions.

It should be noted that the slightly open state described in the embodiments means that the duckbill valve has a preset tiny gap at the opening under normal conditions.

In some embodiments, the one-way valve 114 may be a spring-type one-way valve. When clean water in the external pipeline 152 flows towards the clean water cavity 106, the spring-type one-way valve is opened (the first state) under a pressure of the water flowing towards the clean water cavity 106, to allow water to be transported to the clean water cavity 106. When water in the external pipeline 152 stops flowing to the clean water cavity 106, the spring-type one-way valve is closed (the second state) by way of its own spring force, to restrict clean water flowing out.

Of course, the one-way valve 114 of the present disclosure is not limited to the above-mentioned duckbill valve and spring-type one-way valve, as long as the one-way valve 114 can stay at the first state to allow clean water to flow through when clean water in the external pipeline 152 is transported to the clean water cavity 106, and can change to the second state to restrict the water flowing out when supply of water to the clean water cavity 106 is stopped.

Figure 4:
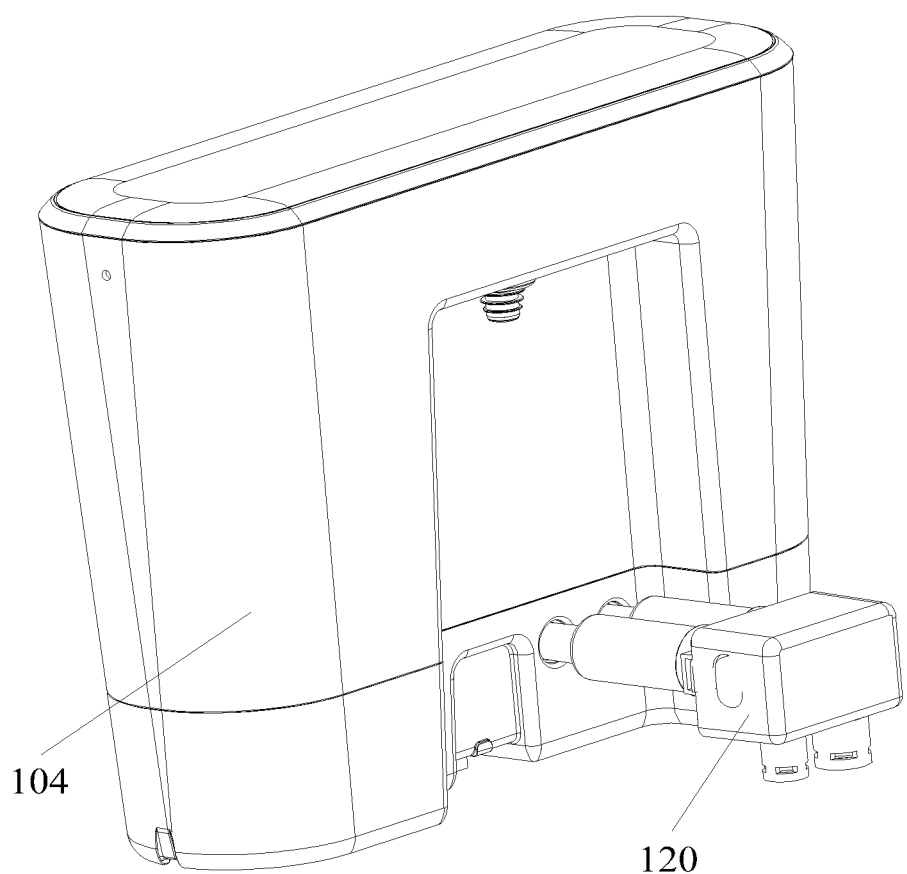
FIG. 4 is a perspective diagram of a water tank assembly according to an exemplary embodiment of the present disclosure.

As shown in FIGS. 4 and 5, the water tank assembly 102 may further include an adapter 120. The adapter 120 is configured for detachably connecting to the tank body 104 and communicating the water inlet channel 107 with the external pipeline 152, so as to facilitate water transporting from the external pipeline 152 to the clean water cavity 106. The adapter 120 can also facilitate the connection between the water inlet channel 107 and the external pipeline 152. When the adapter 120 is detached from the tank body 104, the one-way valve 114 in the water inlet channel 107 can prevent water in the water inlet channel 107 from flowing out.

In some embodiments, as shown in FIGS. 5 and 6, a water inlet pipeline structure 121 may be protruded from the bottom of the tank body 104. The water inlet pipeline structure 121 includes a water inlet 123 and a water outlet 125, and water in the water inlet channel 107 enters the clean water cavity 106 through the water inlet 123 and the water outlet 125 successively.

The water inlet pipeline structure 121 in the present disclosure is not limited to the above. For example, the water inlet pipeline structure 121 can be protruded upwards from the bottom of the tank body 104 towards the clean water cavity 106; the water inlet pipeline structure 121 can also be protruded from the bottom of the tank body 104 towards the direction away from the clean water cavity 106. Of course, the water inlet pipeline structure 121 may also include a first portion protruding upwards towards the clean water cavity 106, and a second portion protruding towards the direction away from the clean water cavity 106, and the first portion and the second portion are communicated, etc.

The water tank assembly 102 further includes a water inlet connector 109. One end of the water inlet connector 109 is connected with a first water inlet pipe 112 which is configured for connecting with the adapter 120, and the other end of the water inlet connector 109 is connected to the water inlet 123 and communicated with the clear water cavity 106. A first water inlet channel 113 is defined inside the first water inlet pipe 112, a second water inlet channel 111 is defined inside the water inlet connector 109, and the water inlet channel 107 includes the first water inlet channel 113 and the second water inlet channel 111.

The first water inlet pipe 112 is communicated with the external pipeline 152 through the adapter 120, and water in the external pipeline is transported to the clean water cavity 106 through the channel inside the adapter 120, the first water inlet channel 113, and the second water inlet channel 111. When the adapter 120 is disassembled from the tank body 104, the one-way valve 114 disposed in the water inlet channel 107 can prevent the clean water from flowing out from the first water inlet pipe 112.

Of course, the water inlet channel 107 is not limited to the above, as long as it can communicate with the external pipeline 152 to transport clean water to the clean water cavity 106. For example, the first water inlet pipe 112 may merely include a single water pipe, or may be formed by connecting at least two water pipes; the tank body 2 may also be directly connected to the pipe of the adapter 120 through the water inlet connector 109 or directly connected to the external pipeline 152, etc.

It should be noted that the water inlet connector 109 may be connected to the water inlet 123 of the tank body 104 and communicated with the clean water cavity 106 through the water inlet 25; the water inlet connector 109 can also be directly inserted into the clean water cavity 106 through the water inlet 123 of the tank body 104; or the tank body 104 is provided with the water inlet pipeline structure 121 protruding in the direction away from the clean water cavity 106, the water inlet 123 is defined at one end of the water inlet pipeline structure 121 away from the clean water cavity 106, the water inlet pipeline structure 121 is communicated with the clean water cavity 106, and the water inlet connector 109 is connected with the water inlet pipeline structure 121 and communicated with the clean water cavity 106 through the water inlet pipeline structure 121, etc., which is not limited here.

In some embodiments, the one-way valve 114 may be a duckbill valve, and the duckbill valve is capable of being sandwiched between the water inlet 123 and the water inlet connector 109 to seal the joint of the water inlet 123 and the water inlet connector 109. The arrangement of the duckbill valve between the water inlet 123 and the water inlet connector 109 can not only block water back-flow at the water inlet 123, but also can seal the joint of the water inlet 123 and the water inlet connector 109, such that there's no need for an extra sealing member to seal the joint of the water inlet 123 and the water inlet connector 109, which simplifies the structure of the water tank assembly 102 and reduces the cost.

In an exemplary embodiment, as shown in FIG. 6, the water inlet connector 109 can be assembled to the tank body 104 through a fastener 127. In an assembled state, the water inlet connector 109 and the tank body 104 defines an installation gap (not shown in the figures) therebetween for installing the duckbill valve. The duckbill valve is clamped at the installation gap for preventing the water inlet connector 109 from shaking relative to the tank body 104, so as to achieve a sealing connection between the water inlet connector 109 and the tank body 104. In case the duckbill valve is not installed, due to the existence of the installation gap, the water inlet connector 109 will shake when it is assembled to the tank body 104 through the fastener 127, which can detect whether the duckbill valve is installed at the water inlet 123.

In some embodiments, an outer periphery of the water inlet end of the duckbill valve may be provided with a lap portion 116 protruding outwards, a connecting portion 118 is provided at the water inlet 123, the lap portion 116 is lapped with the connecting portion 118, and the lap portion 116 is sandwiched between the water inlet connector 109 and the water inlet 123. By arranging the lap portion 116 on the outer periphery of the duckbill valve, the duckbill valve can be easily clamped between the water inlet connector 109 and the water inlet 123, which is beneficial to improve the tightness between the water inlet connector 109 and the water inlet 123.

As shown in FIG. 6, in order to further improve the tightness of the water inlet connector 109 and the water inlet 123, as well as the installation reliability of the duckbill valve, the lap portion 116 may be defined with a groove 117, the connecting portion 118 may include a protrusion 119 protruding in a direction away from the clean water cavity 106, and the protrusion 119 is engaged in the groove 117.

Of course, the one-way valve 114 is not limited to the duckbill valve, nor is limited to being arranged between the water inlet connector 109 and the water inlet 123, as long as it is positioned in the water inlet channel 107 and can restrict water in the water inlet channel 107 from flowing out when the adapter 120 is disassembled from the tank body 104.

In some embodiments, the water inlet connector 109 may be a transparent or translucent member, so that it is convenient to check whether the duckbill valve is installed; or, the first water inlet pipe 112 may be a transparent or translucent member to provide a convenience for checking whether the duckbill valve is installed.

Of course, both the water inlet connector 109 and the first water inlet pipe 112 can be set as transparent or translucent members, or only one of them is set as transparent or translucent member.

Figure 7:
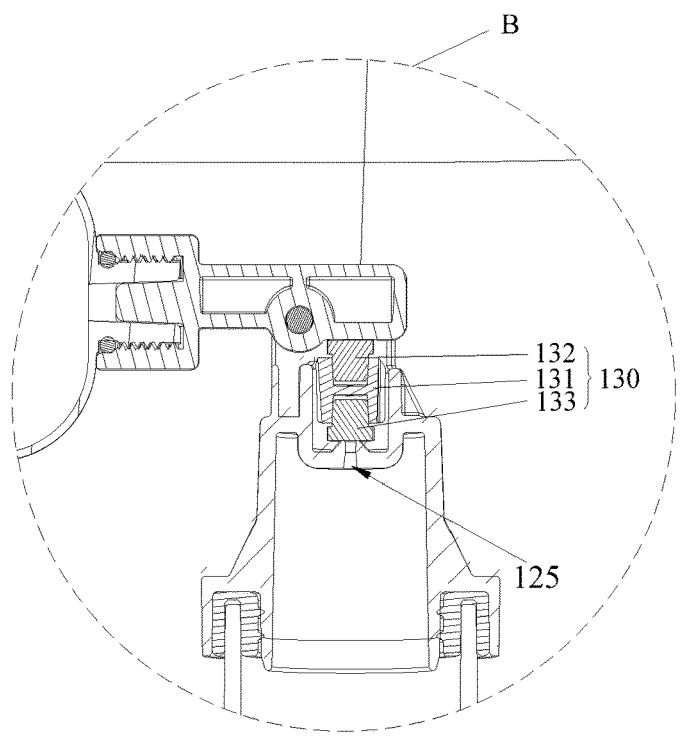
FIG. 7 is an enlarged view of portion B in FIG. 5.

Referring to FIGS. 5 and 7, a ball float valve 129 may be provided in the clean water cavity 106, and a floating plug structure 130 may be provided at the water outlet 125 of the water inlet pipeline structure 121. The ball float valve 129 is configured to move up or down according to the water level inside the clean water cavity 106, so as to push the plug structure 130 downwards or release the plug structure 130 upwards. When the water level reaches to a preset height, the plug structure 130 moves down to block the water outlet 125. The plug structure 130 includes a mounting body 131, a first elastic body 132 mounted on one end of the mounting body 131 in the height direction of the mounting body 131, and a second elastic body 133 mounted on the other end of the mounting body 131 in the height direction of the mounting body 131. When the water level in the clean water cavity 106 gets low, the plug structure 130 does not block the water outlet 125, so the clean water flowing towards the clean water cavity 106 from the water inlet channel 107 can normally flow into the clean water cavity 106 through the water inlet 123 and the water outlet 125. As the water level rises, the ball float valve 129 will make a movement caused by a buoyancy of the clean water, and when the water level in the clean water cavity 106 reaches a preset height, the plug structure 130 will be pushed downwards by the ball float valve 129 to the water outlet 125 and block the water outlet 125, to prevent the water level in the clean water cavity 106 getting too high. Further, the plug structure 130 has the first elastic body 132 and the second elastic body 133 with each installed at one end of the plug structure 130 in the height direction, each one of the first elastic body 132 and the second elastic body 133 can block the water outlet 125, such that even though the plug structure 130 is installed reversely, it can still avoid an insufficient sealing to the water outlet 125.

Further, the structure and shape of the first elastic body 132 and the second elastic body 133 may be the same, so that they can be produced by a same mold to reduce the cost.

The inventors found, by way of creative work, that the cleaning base station having a sewage cavity capable of discharging sewage by a water pump, the impellers of the water pump is prone to be blocked if there are large amount of impurities in the sewage, therefore, the reliability of sewage discharging is poor. In some instances, a filter screen is installed before the water pump to reduce the risk of impurities sticking to the water pump, when the sewage needs to pass through the water pump. However, in this case, since there is a large amount of impurities in the sewage, users need to clean, take care, or replace the filter screen periodically; further, the filter screen is prone to breed bacteria and stink, which will result a slightly poorer using experience. In order to solve the above-mentioned technical problems, another embodiment of the present disclosure provides a water tank assembly, as shown in FIGS. 1 to 5, 8 and 9, the present disclosure provides another base station for servicing the cleaning apparatus. The base station includes a base station body 210 and a water tank assembly 103. The base station body 210 is provided with a cleaning system, the water tank assembly 103 includes a tank body 105, and a sewage cavity 135 is defined in the tank body 105 to receive sewage introduced by the cleaning system. The tank body 105 is provided with a water inlet channel 108 and a sewage discharging channel 136 both communicating with the sewage cavity 135; the sewage cavity 135 is configured to receive the sewage coming through the water inlet channel 108 under a negative pressure introduced by an external gas source, and is configured to discharge the sewage through the sewage discharging channel 136 under a positive pressure introduced by the external gas source.

The water inlet channel 108 is provided with a one-way valve 115. When the sewage cavity 135 is in a positive pressure state, the one-way valve 115 is in a closed state; when the sewage cavity 135 is in a negative pressure state, the one-way valve 115 is in an open state.

When external air source applies negative pressure to the sewage cavity 135, the one-way valve 115 is in an open state, so that sewage can be sucked into the sewage cavity 135 through the water inlet channel 108; when sewage needs to be discharged from the sewage cavity 135, external air source applies positive pressure to the sewage cavity 135, so that the sewage can be discharged through the sewage discharging channel 136, and the one-way valve 115 is in a closed state to obstruct gas in the sewage cavity 135 from leaking from the one-way valve 115 in the water inlet channel 108, to ensure the sewage in the sewage cavity 135 can be discharged from the sewage discharging channel under the positive pressure.

In addition, the one-way valve 115 can also obstruct the sewage flowing out from the water inlet channel 108 under a positive pressure. It should be noted that, "flowing out" in the embodiments means that the sewage from the sewage cavity 135 flows to the cleaning system along the water inlet channel 108.

It should be understood that, the tank body 105 can be defined with a gas hole to allow the external air source applying positive pressure or negative pressure to the sewage cavity 135. The gas hole is connected to the external air source through an air pipe. The external air source can include but not limited to air pump. If the external air source is an air pump, the number of the air pump is not limited to one. In some embodiments, the number of the air pump may be two, one of which may be configured to apply positive pressure to the sewage cavity 135, and the other may be configured to apply negative pressure to the sewage cavity 135.

In some embodiments of the present application, the one-way valve 115 may be a duckbill valve. Preferably, as shown in FIG. 8, the duckbill valve may be vertically suspended in the tank body, and impurity particles may fall down under their own gravity, such that it can effectively reduce the risk of impurity particles getting stuck at the opening of the duckbill valve and blocking or damaging the duckbill valve.

When the water tank assembly 103 is installed on the base station body 210, the water inlet channel 108 of the tank body 105 is connected to a water delivery pipeline of the cleaning system, to allow the sewage cavity 135 to receive the sewage introduced by the cleaning system.

It should be understood that the water inlet channel 108 can be arranged on the tank body 105, and can also be arranged on the pipeline connected to the tank body 105, or a portion of the water inlet channel 108 is arranged on the tank body 105 and the other portion of the water inlet channel 108 is arranged on the pipeline connected to the tank body 105.

Figure 8:
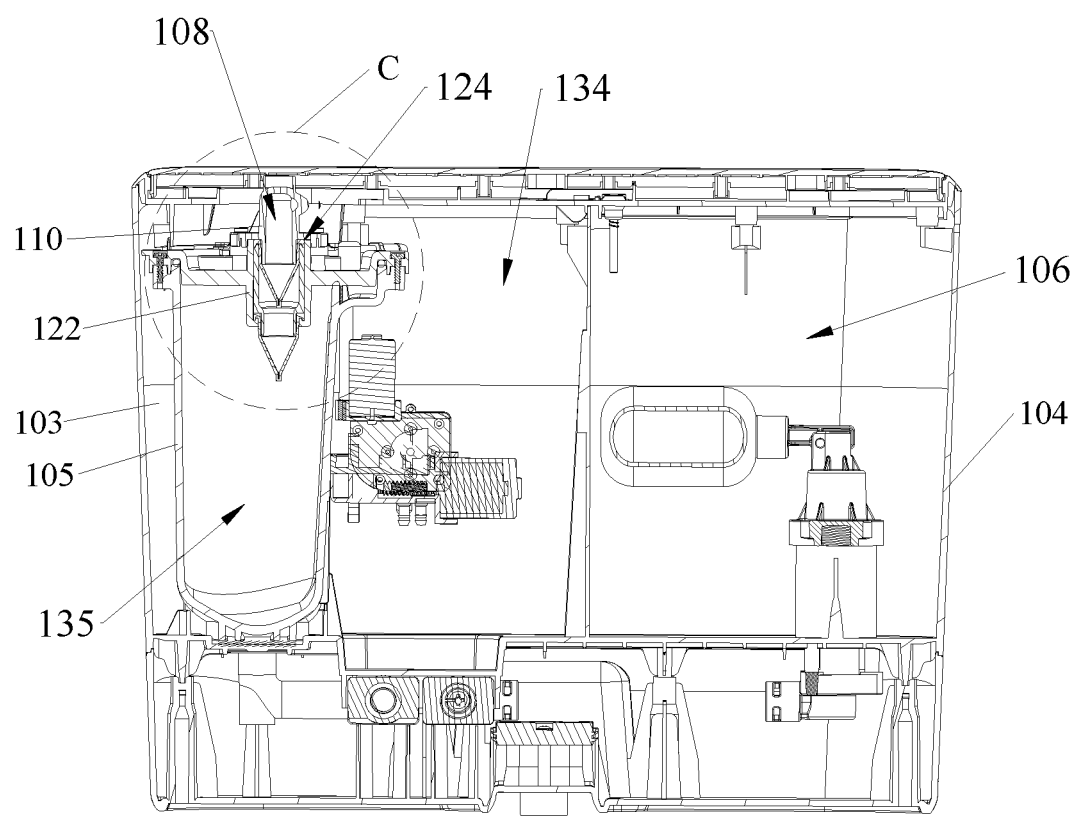
FIG. 8 is another cross-sectional view of the water tank assembly according to an exemplary embodiment of the present disclosure.
Figure 9:
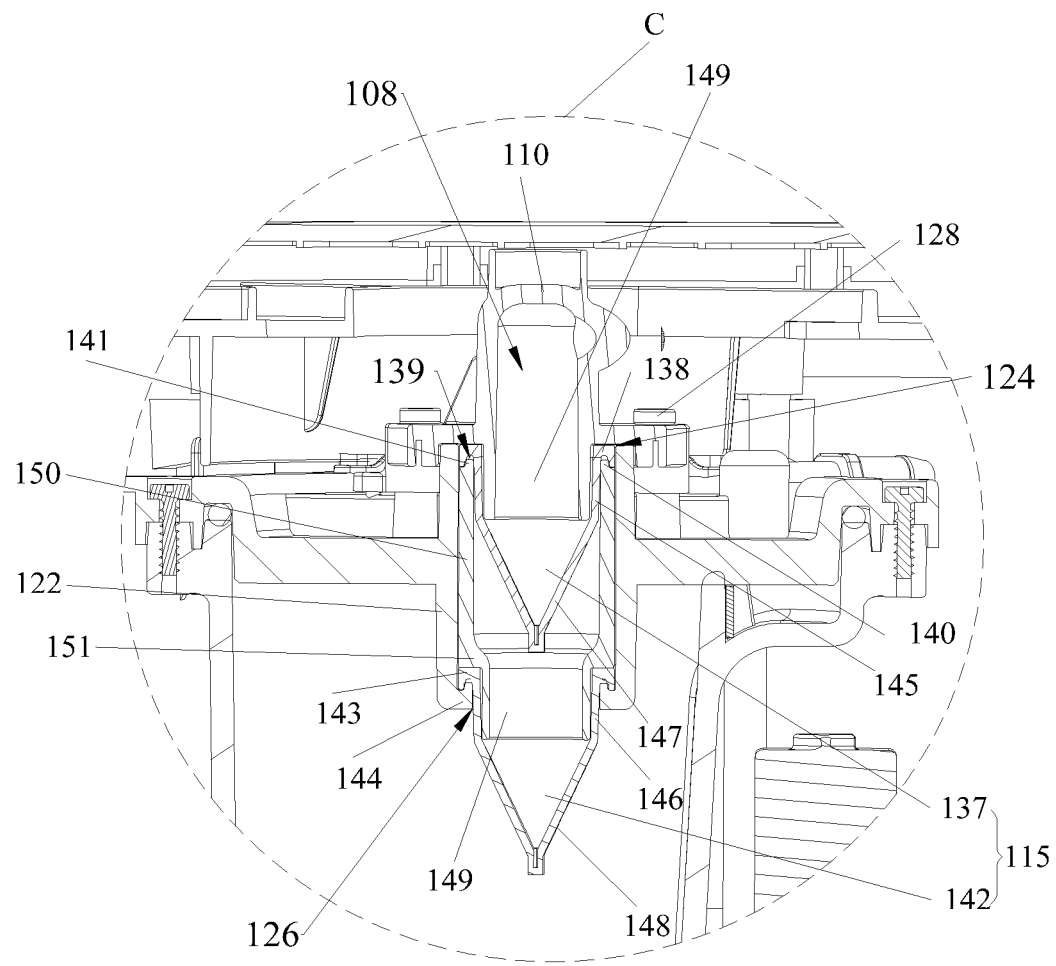
FIG. 9 is an enlarged view of portion C in FIG. 8.
Figure 10:
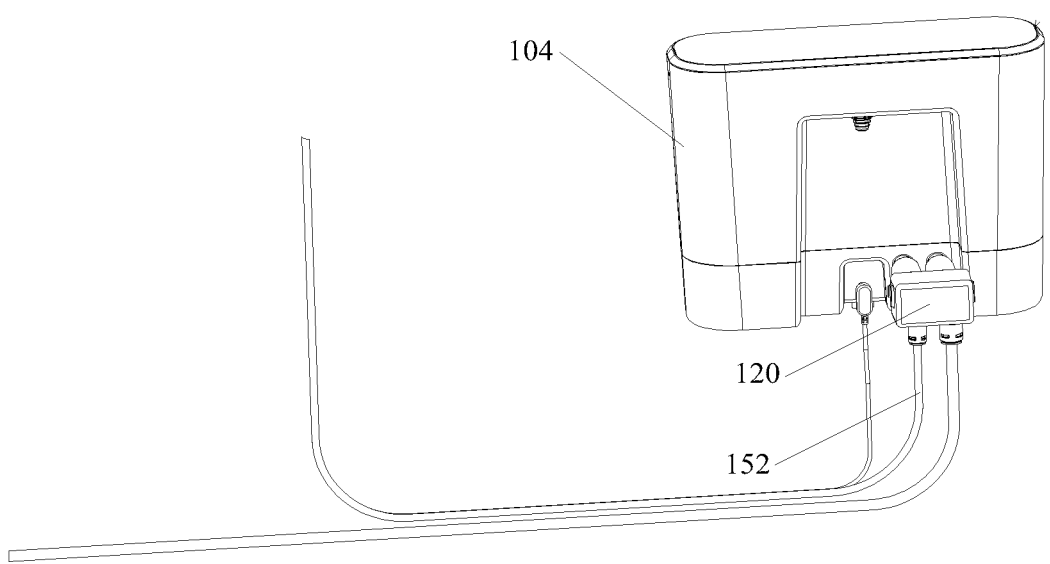
FIG. 10 is a schematic diagram of an adapter of the water tank assembly connecting with external pipeline according to an exemplary embodiment of the present disclosure.

As shown in FIG. 8 and FIG. 9, the one-way valve 115 is a duckbill valve. When external air source applies negative pressure to the sewage cavity 135, the external air pressure is greater than the air pressure in the sewage cavity 135, the retractable opening of the duckbill valve is opened so that sewage can be sucked into the sewage cavity 135. When external air source applies positive pressure to the sewage cavity 135, the external air pressure is less than the air pressure in the sewage cavity 135, the retractable opening of the duckbill valve is closed so as to restrict the sewage flowing out from the water inlet channel 108. Normally, the duckbill valve is in a slightly open state allowing gas to pass through but not water. Of course, the one-way valve 115 in the embodiments of the present disclosure is not limited to the duckbill valve, as long as it can be in an open state during the sewage cavity 135 is in a negative pressure state and a closed state during the sewage cavity 135 is in a positive pressure state.

In some embodiments, the one-way valve 115 may include a first duckbill valve 137 and a second duckbill valve 142 sequentially arranged along the water inputting direction. By arranging the first duckbill valve 137 and the second duckbill valve 142 in the water inlet channel 108, it is possible to prevent the sewage flowing out from the water inlet channel 108 in case one of the first duckbill valve 137 and the second duckbill valve 142 is damaged. In addition, when positive pressure is applied to the sewage cavity 135 for draining sewage but the sewage discharging channel 136 is blocked, it is probably to cause a very high positive pressure in the sewage cavity 135, while a sealed space defined by the first duckbill valve 137 and the second duckbill valve 142 in the water inlet pipeline structure 122 contains air, which can balance with the positive pressure in the sewage cavity 135, such that it is beneficial to prevent the second duckbill valve 142 from upturning.

The one-way valve 115 is a flexible duckbill valve and is suspended, when a positive pressure is applied to the sewage cavity 135 but the sewage discharging channel 136 is blocked, it would cause a very high positive pressure in the sewage cavity 135, which is probably to make the duckbill valve upturn under the positive pressure. In order to reduce the risk of upturning, a mounting part 149 may be provided at the water inlet channel 108 of the tank body 105 for installing the one-way valve 115. The mounting part 149 defines a water inlet passage for water flowing through, and the duckbill valve is sleeved on the mounting part 149. By arranging the duckbill valve on the mounting part 149, it is beneficial to obstruct the duckbill valve from upturning by way of a resistance from the mounting part 149 when external air source applies positive pressure to the sewage cavity 135. In addition, the arrangement of the mounting part 149 at the water inlet channel 108 can also facilitate the installation of the duckbill valve.

It should be noted that the duckbill valve includes a water inlet end 145/146 and a water outlet end 147/148, the water inlet end 145/146 is shaped as a straight cylinder, and the water outlet end 147/148 has a cross-sectional area gradually decreases from the end closing to the water inlet end 145/146 to the end away from the water inlet end 145/146. The mounting part 149 extends to the junction of the water inlet end 145/146 and the water outlet end 147/148, so the mounting part 149 would not expand the water outlet end 147/148 of the duckbill valve, such that the water outlet end 147/148 will not be always opened which may lose the function of preventing sewage from flowing out through the water inlet channel 108.

Of course, in some embodiments of the present disclosure, the duckbill valve may be arranged at different positions of the water inlet channel 108, as long as the sewage can be restricted flowing out from the water inlet channel 108.

As shown in FIG. 8, the one-way valve 115 includes a first duckbill valve 137, the tank body 105 is detachably connected with a water inlet connector 110, an end of the water inlet connector 110 closing to the sewage cavity 135 defines the mounting part 149, and the water inlet end 145 of the first duckbill valve 137 is sleeved on the water inlet connector 110. The water inlet end 145 of the first duckbill valve 137 can be resisted by the water inlet connector 110 since the water inlet end 145 is sleeved on the water inlet connector 110, when positive pressure is applied to the sewage cavity 135, it can effectively obstruct the first duckbill valve 137 from upturning by way of the resistance from the water inlet connector 110.

In some embodiments, the outer periphery of the water inlet end 145 of the first duckbill valve 137 is provided with a first lap portion 138 protruding outwards, the water inlet 124 of the tank body 105 is provided with a first connecting portion 140, and the first lap portion 138 is overlapped with the first connecting portion 140 and sandwiched between the water inlet connector 110 and the water inlet 124, which can realize a sealed connection between the water inlet connector 110 and the water inlet 124 with no additional sealing members being used, thereby the structure of the water tank assembly 103 is simplified and the cost is reduced.

In some embodiments, the first lap portion 138 is recessed with a first groove 139, the first connecting portion 140 includes a first convex portion 141 protruding in a direction away from the sewage cavity 135, and the first convex portion 141 is engaged in the first groove 139, which may further improve the leakproofness between the water inlet connector 110 and the water inlet 124.

The one-way valve 115 further includes a second duckbill valve 142 to improve the stability of restricting the sewage flowing out from the water inlet channel 108. The tank body 105 has the water inlet pipeline structure 122, one end of the water inlet pipeline structure 122 is communicated with the water inlet connector 110, and the other end of the water inlet pipeline structure 122 having a water outlet 126 is protruded towards the inside of the sewage cavity 135. The water inlet end 146 of the second duckbill valve 142 is arranged at the water outlet 126, a bushing 150 is provided inside the water inlet pipeline structure 122, the bushing 150 defines the mounting part 149, and the water inlet end 146 is sleeved on the bushing 150.

By arranging the first duckbill valve 137 and the second duckbill valve 142 in the water inlet channel 108, it is possible to restrict the sewage flowing out from the water inlet channel 108 in case any one of the first duckbill valve 137 and the second duckbill valve 142 is damaged. The water inlet end 146 of the second duckbill valve 142 is sleeved on the mounting part 149 in the bushing 150, so the water inlet end 146 can be resisted by the mounting part 149, when external air source applies positive pressure to the sewage cavity 135, it is beneficial to obstruct the second duckbill valve 142 from upturning by way of the resistance from the mounting part 149. In addition, when positive pressure is applied to the sewage cavity 135 for draining sewage but the sewage discharging channel 136 is blocked, it is probably to cause a very high positive pressure in the sewage cavity 135, while a sealed space defined by the first duckbill valve 137 and the second duckbill valve 142 arranged in the water inlet pipeline structure 122 contains air, which can balance with the positive pressure in the sewage cavity 135, to further obstruct the second duckbill valve 142 from upturning.

In some embodiments, an outer periphery of the water inlet end 146 of the second duckbill valve 142 may be provided with a second lap portion 143 protruding outwards. The bushing 150 is defined with an abutting portion 151, an inner side of the water outlet 126 is provided with a second connecting portion 144, and the second lap portion 143 is overlapped on the second connecting portion 144 and clamped between the abutting portion 151 and the second connecting portion 144, to realize a sealed connection between the water outlet 126 and the second connecting portion 144, and a stable connection between the second duckbill valve 142 and the water inlet pipeline structure 122.

In some embodiments, the outer periphery of the water inlet end 146 of the first duckbill valve 137 is provided with a first lap portion 138 protruding outwards, one end of the bushing 150 away from the second duckbill valve 142 defines the first connecting portion 140, the first lap portion 138 is clamped among the water inlet 124 of the water inlet pipeline structure 122, the bushing 150, and the water inlet connector 110, so as to realize a sealed connection between the water inlet connector 110 and the water inlet 124 with no additional sealing member being used, thereby the structure of the water tank assembly 103 is simplified and the cost is reduced.

Of course, the first connection portion 140 is not limited to being arranged on the bushing 150. For example, the first connection portion 140 may be directly formed at one end of the water inlet pipeline structure 122 closing to the water inlet connector 110.

In order to improve the stability of the connection between the water inlet connector 110 and the tank body 105, the one-way valve 115 adopts a duckbill valve, and the water inlet connector 110 is assembled to the tank body 105 through a fastener 128. In an assembled state, the water inlet connector 110 and the tank body 105 defines an installation gap therebetween for installing the duckbill valve. The duckbill valve is clamped in the installation gap to prevent the water inlet connector 110 from shaking relative to the tank body 105, so as to achieve a sealed connection between the water inlet connector 110 and the tank body 105. In case the duckbill valve is not installed, due to the existence of the installation gap, the water inlet connector 110 will shake when it is assembled to the tank body 105 through the fastener 128, which can detect whether the duckbill valve is installed.

In some embodiments, the water inlet connector 110 may be a transparent or translucent member, so as to facilitate checking whether the duckbill valve is installed.

As shown in FIGS. 3 to 9, in an exemplary embodiment, the tank body 104 is defined with a clean water cavity 106 and a mounting cavity 134, and the tank body 105 as a sewage tank is installed in the mounting cavity 134. The tank body 104 is provided with a water inlet interface that communicates with the mounting cavity 134, and the water inlet channel 108 is connected at the water inlet interface. When the tank body 104 is installed on the base station body 210, the water inlet interface is connected to a sewage interface of the cleaning system, and the sewage discharging channel 136 is located under the tank body 105. It should be noted that the water tank assembly 102 is not limited to this, for example, the tank body 104 may not be provided with the mounting cavity, and the tank body 105 may be directly installed on the base station body 210; or, the tank body 104 and the tank body 105 can be the same tank body, that is, both the clean water cavity 106 and the sewage cavity 135 are defined in the same tank body.

The base station may include a cleaning system for servicing the cleaning robot. For example, the cleaning system may be configured to clean the mops of the cleaning robot. The base station may be equipped with a clean water tank and a sewage tank, water in the clean water tank is supplied to the cleaning system, and the sewage tank is configured to collect the sewage generated by the cleaning system. The clean water tank may be connected to the outside, so that clean water from the outside can be inputted to the clean water tank; and the sewage tank is connected to the outside, so that sewage in the sewage tank can be discharged to the outside.

However, in the related art, water is usually sucked into the water tank by using an air source to apply negative pressure to the water tank, and water in the water tank is usually drained by using a water pump. As such, both gas source and water pump are needed for the water tank, which results in a complex structure. Further, in case the water quality is poor and there are many impurities in the water, the impurities are probably to damage the impeller of the water pump, and even cause the impeller to become stuck.

Figure 11A:
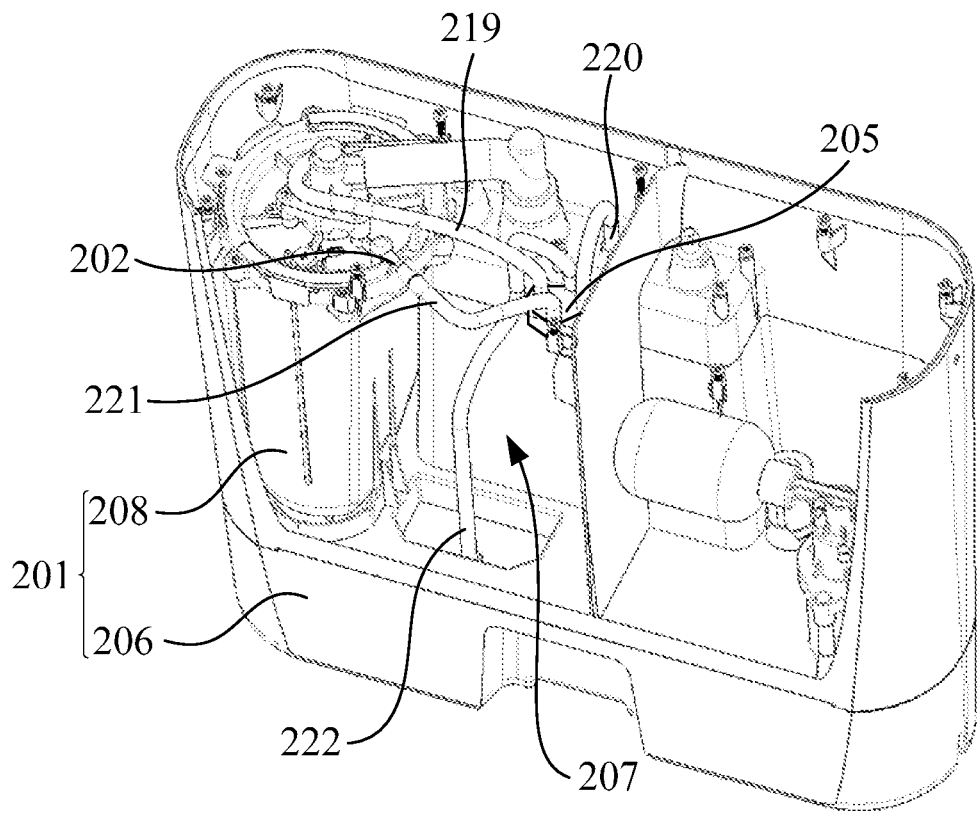
FIG. 11a is a schematic diagram of a first water tank according to an exemplary embodiment of the present disclosure.
Figure 11B:
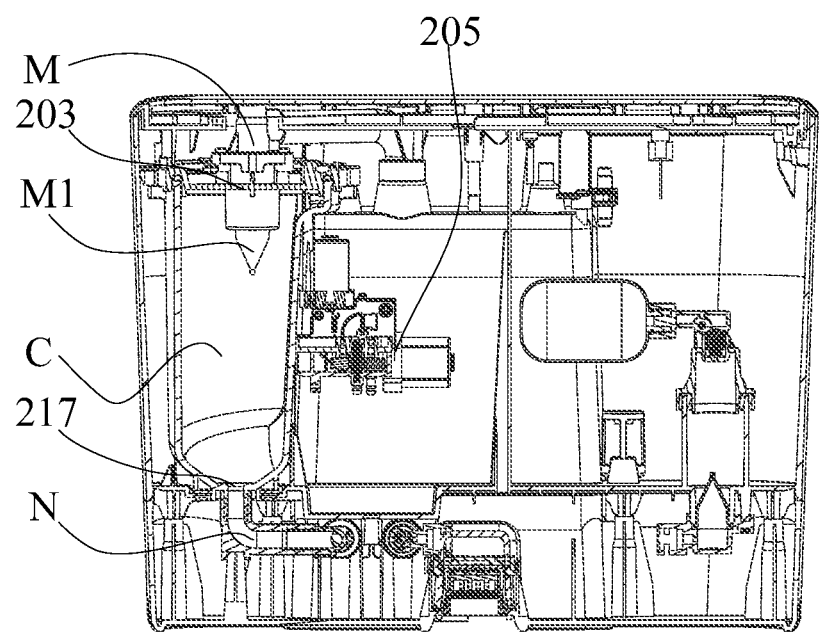
FIG. 11b is a cross-sectional view of a first water tank according to an exemplary embodiment of the present disclosure.

Referring to FIG. 11a and FIG. 11b, the present disclosure also provides a pumping and drainage system which includes:
- a first water tank 201, the first water tank 201 is defined with a water storage cavity C and a vent 202 communicated with the water storage cavity C;
- a gas source system communicated with the vent 202;
- in case the gas source system is in a first state, air in the water storage cavity is discharged through the vent 202 and the gas source system successively, causing the water storage cavity C to be in a negative pressure state, so that fluid can be sucked to the water storage cavity C; in case the gas source system is in a second state, air is delivered to the water storage cavity C by the gas source system through the vent 202, causing the water storage cavity to be in a positive pressure state, so that the fluid in the water storage cavity C can be discharged. The pumping and drainage system provided in the present disclosure can suck water and drain water automatically. The water storage cavity C of the first water tank 201 is configured for water storage (for example, store clean water or sewage).

It should be noted that the fluid described in the embodiments of the present disclosure may be a pure fluid, or a mixed fluid mixed with impurities such as solid particles, hair, and debris.

Taking FIG. 11a as an example, the vent 202 of the first water tank 201 is configured for gas to output or for gas to input, the gas source system is communicated with the vent 202, then gas can be drawn out from the water storage cavity C through the vent 202 or injected into the water storage cavity through the vent 202. Further, the first water tank 201 has a water inlet 203 and a water outlet (not shown in the figure), and both the water inlet 203 and the water outlet communicate with the water storage cavity. The pumping and draining principle of the pumping and drainage system is: in case the gas source system is in the first state, gas in the water storage cavity C is discharged successively through the vent 202 and the gas source system, causing the water storage cavity C to be in a negative pressure state, allowing the first water tank 201 to suck water from the water inlet 203 into the water storage cavity C; in case the gas source system is in the second state, the gas source system delivers gas to the water storage cavity C through the vent 202, causing the water storage cavity C to be in a positive pressure state, so that the first water tank 201 can discharge the water in the water storage cavity C from the water outlet.

In case the water storage cavity of the pumping and drainage system of the present disclosure is configured to store sewage, then it can realize an automatically collecting of sewage and automatically discharging of sewage, such that manually cleaning of sewage is no longer needed, which is very convenient and intelligent, and beneficial to improve using experience.

In case the water storage cavity of the pumping and drainage system of the present disclosure is configured to store clean water, then clean water can be sucked to the water storage cavity from an external water source by the gas source system, and the clean water in the water storage cavity can also be discharged by the gas source system. For example, in case the pumping and drainage system is applied to a cleaning base station, clean water may be discharged (or sprayed) to a cleaning area of the cleaning base station to clean the mops of the robot. Either the gas source system being in a first state or a second state may be determined according to the actual structure of the gas source system. The structure of the gas source system may be various, and will be described in the subsequent embodiments.

In some embodiments, referring to FIG. 11a and 11b, the gas source system may include:
- a gas pump;
- a reversing valve 205, the reversing valve 205 is communicated with the gas pump and the vent 202 respectively, and includes a reversing member which can move between a first position and a second position;
- in case the reversing member is at the first position, the gas in the water storage cavity is discharged through the vent 202, the reversing valve 205, and the air pump successively, causing the water storage cavity to be in a negative pressure state;
- in case the reversing member is at the second position, external gas is inputted into the water storage cavity through the reversing valve 205, the air pump, and the vent 202 successively, causing the water storage cavity to be in a positive pressure state.

Further, the pumping and drainage system of the present disclosure can also be configured to pump and discharge sewage without using an extra power device such as a pump, so as to realize "sewage not passing through pump", which can effectively avoid the pump being damaged and jammed caused by impurities in the sewage, and is beneficial to improve the service life of the pump. Since there is no sewage passing through the pump, it does not need to install a filter screen before the pump, then users no longer need to clean the filter screen, which is conducive to improve using experience.

It should be noted that the structure, the fixing for the reversing valve 205 such as fixing mode and fixing position of the reversing valve 205 in FIGS. 11a and 11b are only an illustrative embodiment, which is not limited to this.

The gas source system is composed of a gas pump and the reversing valve 205. The gas pump is configured to provide a gas source, the reversing valve 205 is arranged between the air pump and the first water tank 201 and communicated with the air pump and the vent 202 respectively, and configured to switch gas circuit.

Compared with using a piston to realize a switching between positive pressure and negative pressure, the using of the air pump and the reversing valve 205 to realize a switching between positive pressure and negative pressure can further adjust the gas input volume or output volume of the air pump. When the gas input volume is greater than the gas output volume, the fluid in the sewage tank will be discharged thoroughly. Compared with using two air pumps to realize a switching between positive pressure and negative pressure, the using of the air pump and the reversing valve 205 to realize a switching between positive pressure and negative pressure is cost saving, and may effectively prolong the service life of the entire gas source system since the service life of the reversing valve 205 is longer than that of the air pump.

The air pump has an air inlet and an air outlet. The air inlet and the air outlet of the air pump, and the vent 202 of the first water tank 201 may communicate with different gas holes of the reversing valve 205. The reversing member of the reversing valve 205 moves between the first position and the second position. The reversing member is defined with gas channels that can coupled with the gas holes to make different gas holes of the reversing valve 205 be communicated, that is, when the reversing member moves to the first position or the second position, different gas holes of the reversing valve 205 will be communicated, causing the air inlet of the air pump communicating with the vent 202, or the air outlet of the air pump communicating with the vent 202.

It should be noted that the number of the vent 202 is not limited to one as shown in the figure. In some embodiments, the number of the vent 202 may be two, one of the vent 202 is configured to deliver the gas from the air pump to the water storage cavity, and another vent 202 is configured for the gas in the water storage cavity to be discharged.

When the reversing member is at the first position, the gas in the water storage cavity is discharged through the vent 202, the reversing valve 205, and the air pump successively, causing the water storage cavity to be in a negative pressure state; when the reversing member is at the second position, external gas is inputted into the water storage cavity through the reversing valve 205, the air pump, and the vent 202 successively, causing the water storage cavity to be in a positive pressure state. The reversing member may be a rotating part, a translational part, etc., and the reversing member may be drove by a driving member to move. In an exemplary embodiment, the driving member may include a motor which drives the reversing member to move by way of a transmission mechanism. The motor can also directly drive the reversing member to move. The structure of the transmission mechanism can be selected according to the actual situation.

Apart from the above described situation, the gas source system can also include other structures. For example, the gas source system may include a forward-reverse air pump which is communicated with the vent 202 of the first water tank 201. As the forward-reverse air pump rotates forward, namely, the gas source system is in the first state, gas in the water storage cavity is discharged through the vent 202 and the forward-reverse air pump successively, causing the water storage cavity to be in a negative pressure state; as the forward-reverse air pump rotates reversely, namely, the gas source system is in the second state, the forward-reverse air pump delivers gas into the water storage cavity through the vent 202, causing the water storage cavity to be in a positive pressure state. For another example, the gas source system includes a cylinder-type structure which is communicated with the vent 202 of the first water tank 201, to realize a switching between the positive pressure and negative pressure states in the water storage cavity by way of moving forward and backward. This is only exemplary, including but not limited to this.

In some embodiments, referring to FIGS. 11a and 11b, the first water tank 201 includes:
  a first tank body 206 defined with an accommodating cavity 207;
  a second tank body 208 arranged in the accommodating cavity 207, the second tank body 208 is configured for accommodating fluid (clean water or sewage);
  the reversing valve 205 is arranged in the accommodating cavity 207.

The first water tank 201 has a structure of "tank in tank", which includes a first tank body 206 and a second tank body 208 located in the first tank body 206. The water storage cavity and the vent 202 of the first water tank 201 are both defined in the second tank body 208, the second tank body 208 is configured to accommodate fluid. If the water storage cavity is configured to accommodate sewage, the sewage in the second tank body 208 can be automatically discharged to the outside, so the second tank body 208 does not need a too large volume, namely, the second tank body 208 can be a small volume tank body. While the reversing valve 205 may be arranged in the first tank body 206 other than the space occupied by the second tank body 208, and gas pipes may also be arranged in the first tank body 206, so as to make full use of the space of the water tank, as well as not expose the gas pipe to achieve dust prevention and beauty. Optionally, the first tank body 206 is made of ABS (acrylonitrile/butadiene/styrene copolymer) material for a beautiful appearance and a good wear resistance. The second tank body 208 needs to accommodate sewage, since the sewage contains complex compositions and is prone to corrode the wall of the second tank body 208 probably caused by some chemical reactions, the second tank body 208 may be made of PP (polypropylene) material to obtain a good resistance to corrosion.

In addition, the water storage cavity C may be connected with a water inlet channel M and a water outlet channel N. A first controlling member is arranged at the water inlet channel M and configured to be opened during the gas source system is in the first state and to be closed during the gas source system is in the second state; and a second controlling member is arranged at the water outlet channel N and configured to be closed during the gas source system is in the first state and to be opened during the gas source system is in the second state.

In some embodiments, the first controlling member may be a one-way valve or a globe valve; in some embodiments, the second controlling member may be a one-way valve or a globe valve. In an exemplary embodiment, as shown in FIG. 11b, the first controlling member is a one-way valve (specifically, a duckbill valve M1), and is arranged at the water inlet 203 of the water inlet channel M. The duckbill valve can be opened when bearing one-way pressure. The direction of the one-way pressure for opening the duckbill valve M1 at the water inlet channel M is consistent with the water input direction of the water inlet channel M. When water in the water storage cavity C needs to be discharged, gas is introduced into the water storage cavity C by the gas source system applying a positive pressure, and the duckbill valve M1 is in a closed state under the air pressure in the water storage cavity C, ensuring the fluid in the water storage cavity C being pushed by the air pressure to the water outlet channel N to be discharged. Similarly, the second controlling member may also be a duckbill valve disposed in the water outlet channel N. When water is needed to be pumped to the water storage cavity C, the gas source system will apply negative pressure to the water storage cavity C, under an external air pressure, the duckbill valve at the water outlet channel N is in a closed state, and gas in the water storage cavity C is pumped away by the gas source system to cause the water storage cavity C to be in a negative pressure state, such that external fluid is capable of being drawn into the water storage cavity C through the water inlet channel M.

Of course, in some other embodiments, the first controlling member may be arranged at any other positions of the water inlet channel M, and the second controlling member may be arranged at any other positions of the water outlet channel N.

In some other embodiments, the pumping and drainage system may include a flexible water inlet pipe (not shown in the figure), the above-mentioned water inlet channel M is defined in the flexible water inlet pipe, and the first controlling member is configured to control radial contraction or relaxation of the flexible water inlet pipe to open or close the water inlet channel M. Similarly, the pumping and drainage system may include a flexible water outlet pipe, the water outlet channel N is defined in the flexible water outlet pipe, and the second controlling member is configured to control radial contraction or relaxation of the flexible water outlet pipe to open or close the water outlet channel N. In an exemplary embodiment, the flexible water inlet pipe and the flexible water outlet pipe may be silicone tubes, the first controlling member and the second controlling member may be the power members capable of clamping or squeezing the flexible water inlet and outlet pipes along the radial direction of the flexible water inlet and outlet pipes, so that the water inlet channel M and the water outlet channel N can be opened or closed. The specific structures of the first controlling member and the second controlling member can be designed according to actual needs, which are not limited here.

Figure 11C:
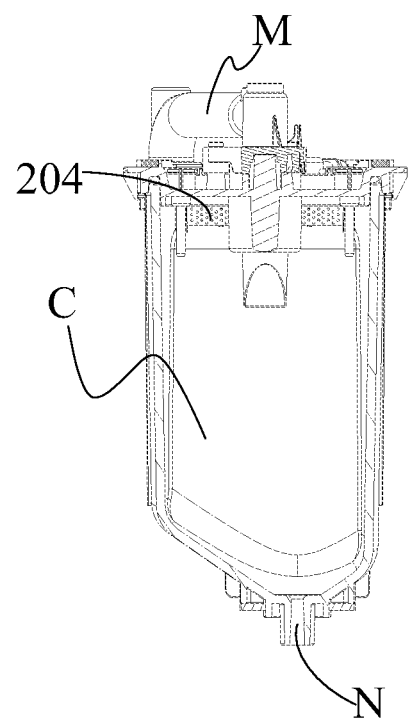
FIG. 11c is a first cross-sectional view of a second tank body according to an exemplary embodiment of the present disclosure.
Figure 11D:
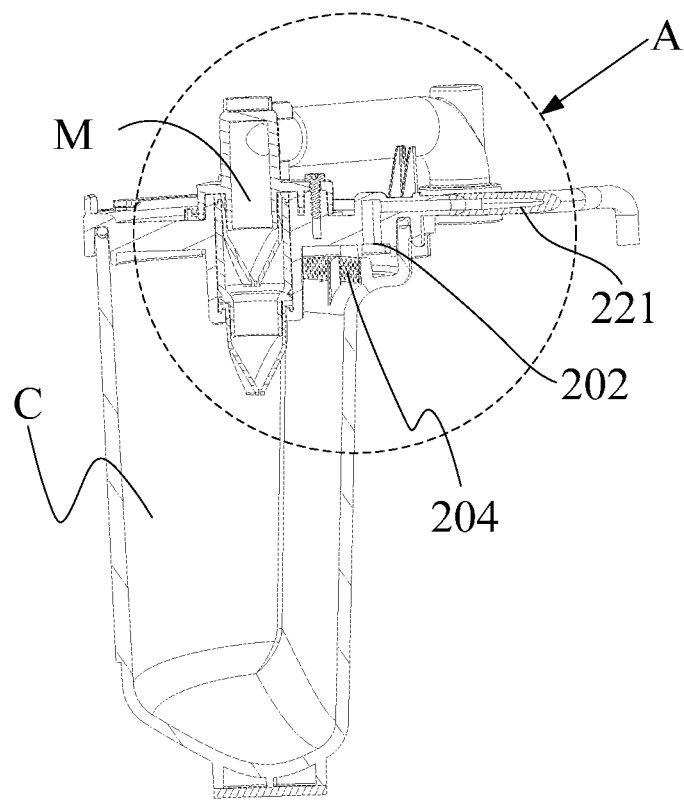
FIG. 11d is a second cross-sectional view of a second tank body according to an exemplary embodiment of the present disclosure.
Figure 11E:
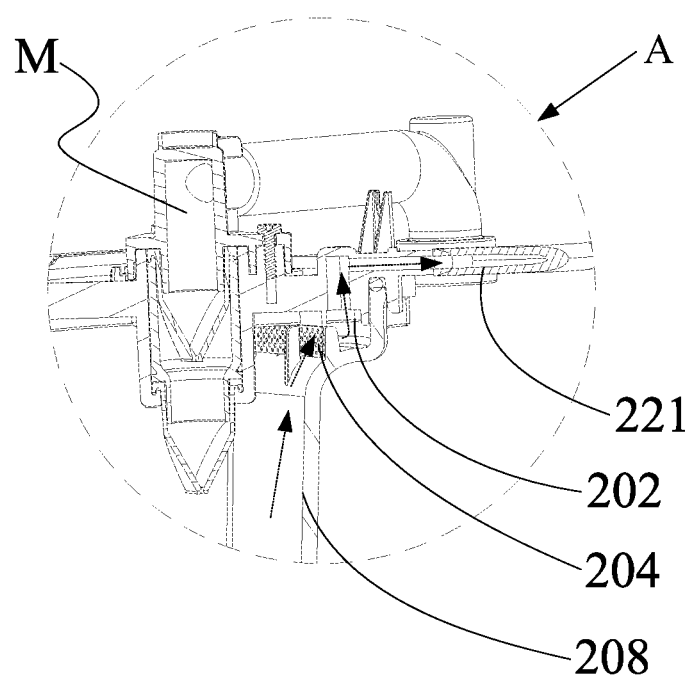
FIG. 11e is an enlarged view of portion A in FIG. 11d.

As shown in FIGS. 11c to 11e, the first water tank 201 may be provided with a filtering member 204 arranged corresponding to the vent. The filtering member 204 is configured to obstruct solid matter from entering the vent 202 and allow gas to enter the vent 202 from the filtering member 204 (as shown in FIG. 11e, the dotted arrow shows the flow path of the gas entering the vent 202 from the water storage cavity C).

In an exemplary embodiment, the filtering member 204 may be fixed in the first water tank 201, and the edge of the first water tank 201 may be in contact with, or abuts against, the housing of the first water tank 201, so that gas in the water storage cavity C can substantially pass through the filtering member 204 first and then enter the vent 202, so as to block the solid matter at the filtering member 204 as much as possible, to reduce the risk of solid matter entering the vent 202 and then entering the gas source system and damaging the gas source system.

The filtering member 204 may be a filtering screen, or other filtering devices that can allow gas to pass through, but can block solid substances from passing through. It should be noted that, with a certain number of through holes, the smaller the pore size of the through hole of the filtering screen, the stronger the ability of blocking solid substances, but the worse the ventilation performance; the larger the pore size of the through hole, the poorer the ability of blocking solid substances, but the better the ventilation performance. Those skilled in the art can select according to the actual needs, which is not limited here.

The present disclosure also provides a base station which includes a base station body 210 and the pumping and drainage system described in the foregoing embodiments. The first water tank 201 is installed on the base station body 210. The structure of the pumping and drainage system can refer to the above-mentioned embodiments. Since the base station adopts the technical solutions of the above-mentioned embodiments, it has at least all the technical effects brought by the technical solutions of the above-mentioned embodiments, which is not repeated here.

In some other embodiments, the gas pump and the reversing valve 205 are both arranged on the base station body 210. The base station body 210 is provided with at least one interface;

the vent 202 communicates with the reversing valve 205 through the interface.

At the base station body 210, the interface is communicated with the reversing valve 205, and the reversing valve is connected with the gas pump. The reversing valve is connected to the gas inlet and the gas outlet of the gas pump through different gas holes of the reversing valve, and the reversing valve is also provided with an exhaust hole for communicating with atmosphere. During the gas pump is in working, the gas flow direction is switched and controlled by the reversing valve 205, gas flows into the gas pump through the interface of the base station body 210, the reversing valve 205, and the gas inlet of the gas pump successively, and then the gas flows to the reversing valve 205 from the gas outlet of the gas pump to flow out through the reversing valve 205; or, gas enters the gas pump from the reversing valve 205 and the gas inlet of the gas pump, then flows out through the gas outlet of the gas pump, the reversing valve 205, and the interface of the base station body 210 successively. In case the base station body 210 is installed with the first water tank 201, the vent 202 may communicate with the reversing valve 205 through the interface. The base station body 210 switches the gas circuit by using the reversing valve 205, which can form a negative pressure gas circuit at the interface, causing the water storage cavity to be in a negative pressure state for drawing water; or, form a positive pressure gas circuit at the interface, causing the water storage cavity to be in a positive pressure state for draining water.

In some embodiments, referring to FIGS. 12 to 14b, FIGS. 16g and 16h, the base station may further include a second water tank 2001. The second water tank 2001 may be an ordinary water tank which cannot automatically pump and drain water.

The second water tank 2001 is configured for manually adding clean water and/or removing sewage. In other words, the second water tank is a conventional water tank (it cannot automatically pump water and/or automatically discharge water during in use), it requires users to manually add clean water or remove the sewage therein, at the time before or after use.

The first water tank 201 and the second water tank 2001 can be alternatively installed to the base station body 210.

In some embodiments, referring to FIGS. 11a to 14a, the reversing valve 205 is arranged on the first water tank 201, and a gas pump Q is arranged on the base station body 210;

the base station body 210 is provided with at least two interfaces, one of which defines a positive pressure interface 211, and the other defines a negative pressure interface 212;

in case the first water tank 201 is installed on the base station body 210, the positive pressure interface 211 is communicated with the reversing valve 205 and the gas outlet of the gas pump, and the negative pressure interface 212 is communicated with the reversing valve 205 and the gas inlet of the gas pump.

Both the positive pressure interface 211 and the negative pressure interface 212 are connected to the gas pump at the base station body 210. The negative pressure interface 212 is coupled to the gas inlet of the gas pump, and the positive pressure interface 211 is coupled to the gas outlet of the gas pump. During the gas pump is working, gas passes through the negative pressure interface 212 and the gas inlet of the gas pump to flow into the gas pump, then flows to the positive pressure interface 211 from the gas outlet of the gas pump, and then flows out through the positive pressure interface 211. When the base station body 210 is installed with the first water tank 201, the positive pressure interface 211 is communicated with the reversing valve 205 and the gas outlet of the gas pump, the negative pressure interface 212 is communicated with the reversing valve 205 and the gas inlet of the gas pump, and the vent 202 of the first water tank 201 is communicated with the reversing valve 205. In the first water tank 201, the reversing valve 205 is arranged to switch gas circuit, causing the vent 202 to be communicated to the negative pressure gas circuit corresponding to the negative pressure interface 212, to allow the water storage cavity to be in a negative pressure state for water inputting; or causing the vent 202 to be communicated to the positive pressure gas circuit corresponding to the positive pressure interface 211, to allow the water storage cavity to be in a positive pressure state for water discharging.

As shown in FIG. 15a to FIG. 15e, the positive pressure interface 211 is provided with a gas inlet 213 that communicates with the gas outlet of the gas pump, and a docking port 215 for docking with the first water tank 201. The gas inlet 213 communicates with the docking port 215;

when the first water tank 201 is installed on the base station body 210, the negative pressure interface 212 is communicated with the first water tank 201, and the docking port 215 of the positive pressure interface 211 is in an open state to connect and communicate with the first water tank 201;

when the second water tank 2001 is installed on the base station body 210, the negative pressure interface 212 is communicated with the second water tank 2001, and the positive pressure interface 211 is communicated to the atmosphere.

In some embodiments, when the second water tank 2001 is installed on the base station body 210, the docking port 215 of the positive pressure interface 211 may be in a closed state. Specifically, the outer wall of the second water tank 2001 can be arranged to cover the docking port 215, or the second water tank 2001 includes a certain component configured to close the docking port 215, to make the docking port 215 be in a closed state. Or, a certain covering member may be movably arranged at the docking port 215 to open or close the docking port 215.

Figure 12:
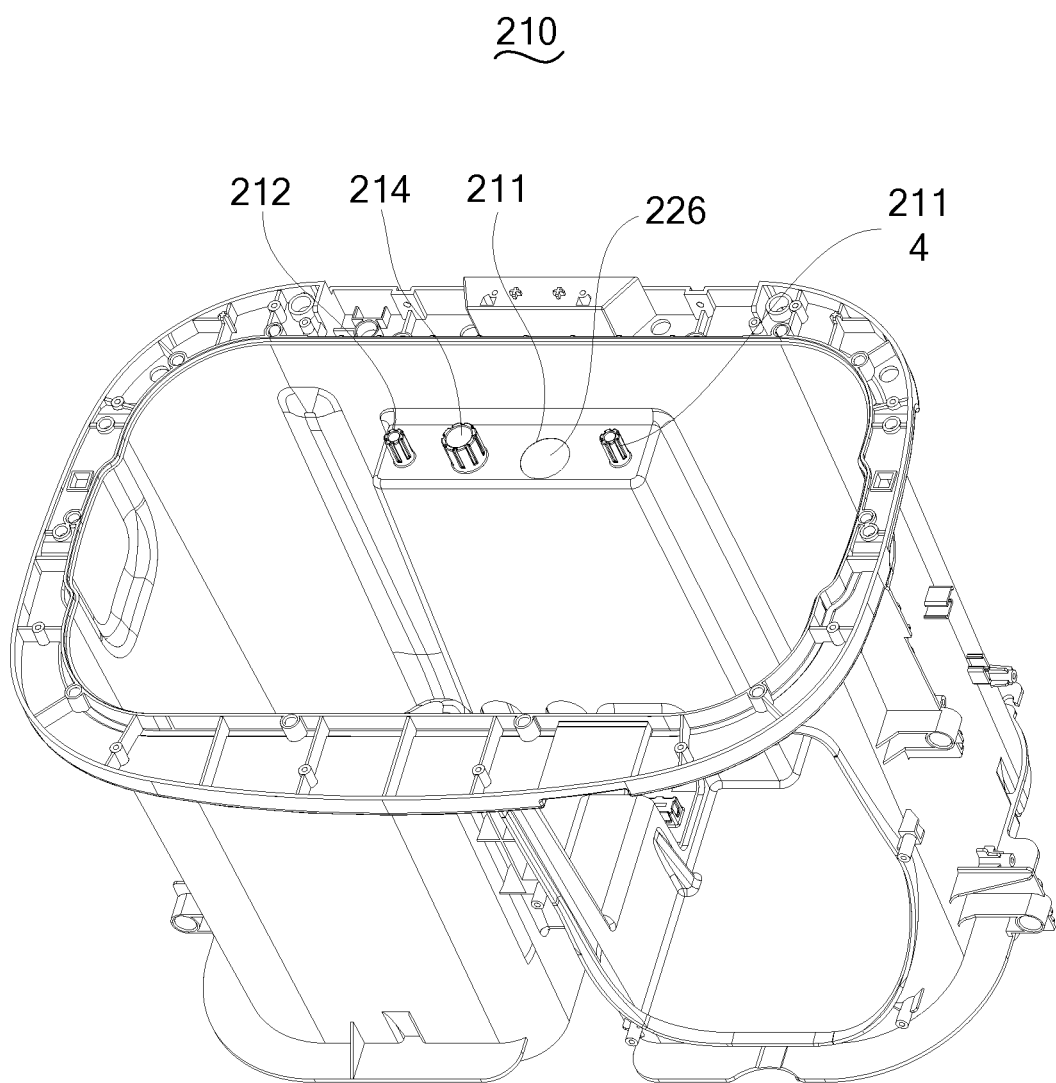
FIG. 12 is a schematic diagram of a base station body according to an exemplary embodiment of the present disclosure.
Figure 14A:
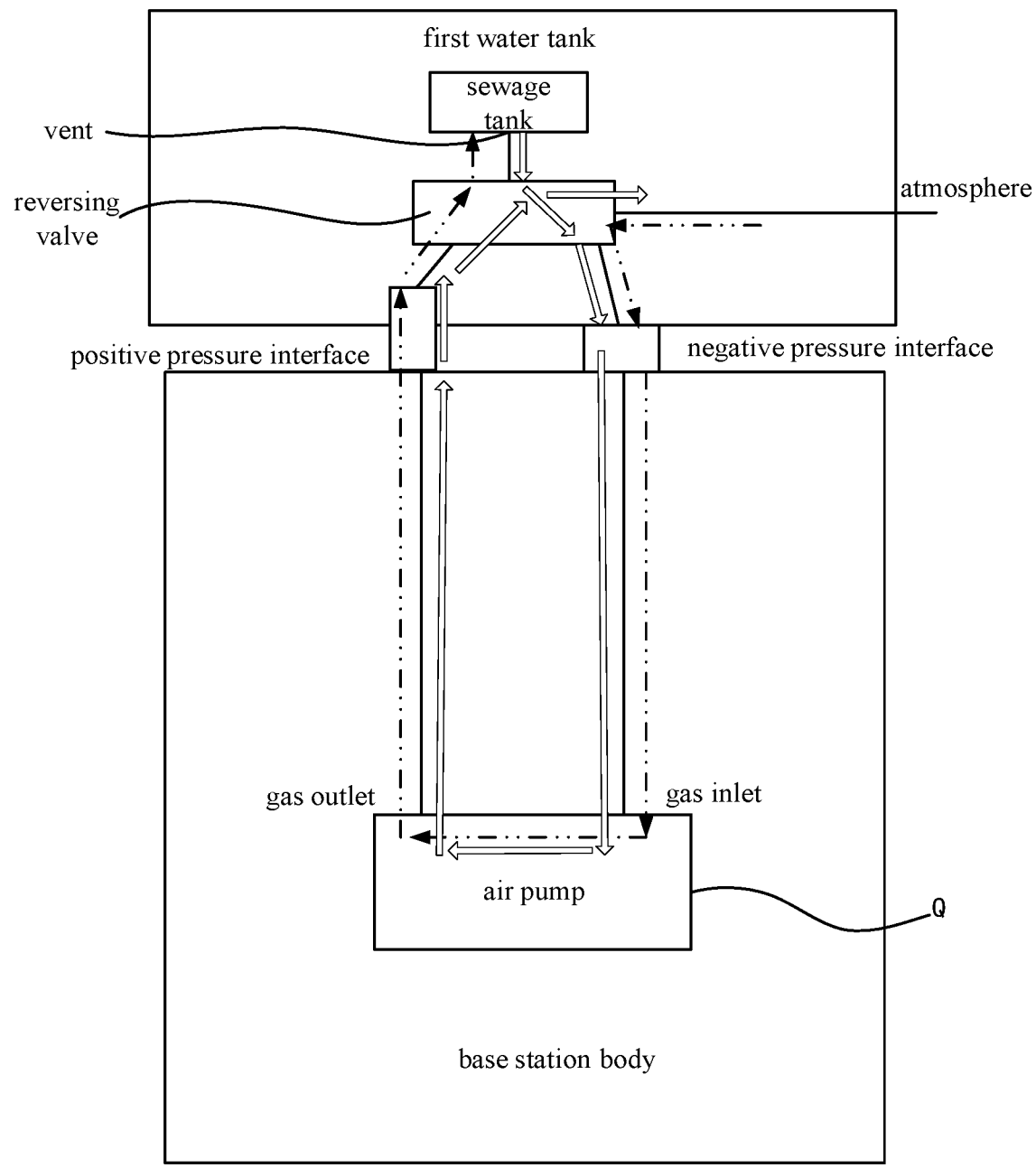
FIG. 14a is a gas circuit schematic diagram in the case the first water tank is installed on the base station body according to an exemplary embodiment of the present disclosure.

Referring to FIGS. 11a, 11b, and 12, and a gas circuit schematic diagram as shown in FIG. 14a, when the base station body 210 is installed with the first water tank 201, the negative pressure interface 212 is communicated to the first water tank 201, and the docking port 215 of the positive pressure interface 211 is in an open state and is in communication with the first water tank 201. During the gas pump is working, the gas pump draws gas from the negative pressure interface 212 or exhausts gas to the docking port 215 of the positive pressure interface 211, to provide negative pressure or positive pressure to the first water tank 201. By using the reversing valve 205 to switch gas circuit, the first water tank 201 can select to communicate the negative pressure gas circuit corresponding to the negative pressure interface 212 to cause the water tank to be in a negative pressure state for water inputting; or select to communicate the positive pressure gas circuit corresponding to the positive pressure interface 211 to cause the water tank to be in a positive pressure state for water discharging.

Figure 14B:
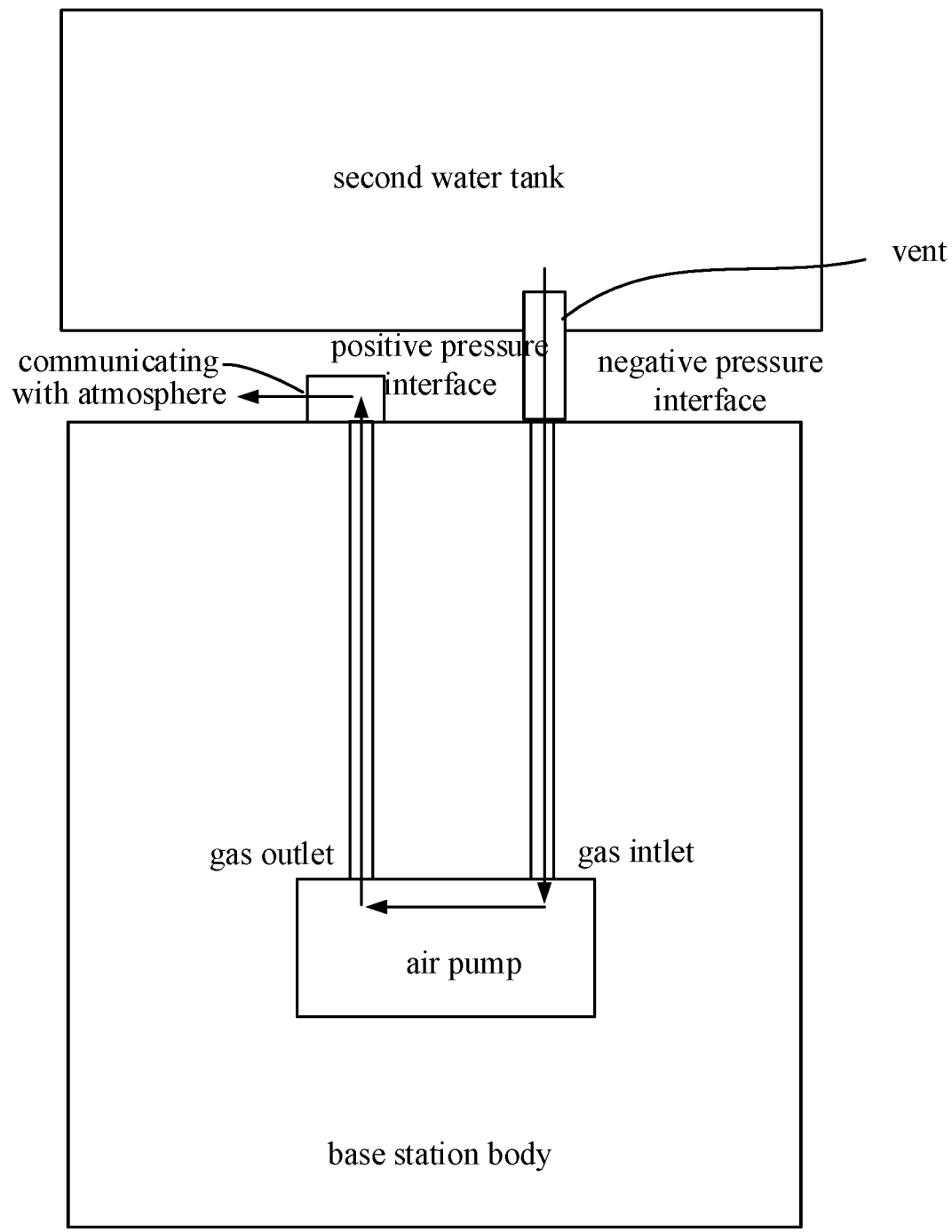
FIG. 14b is a gas circuit schematic diagram in the case a second water tank is installed on the base station body according to an exemplary embodiment of the present disclosure.
Figure 14C:
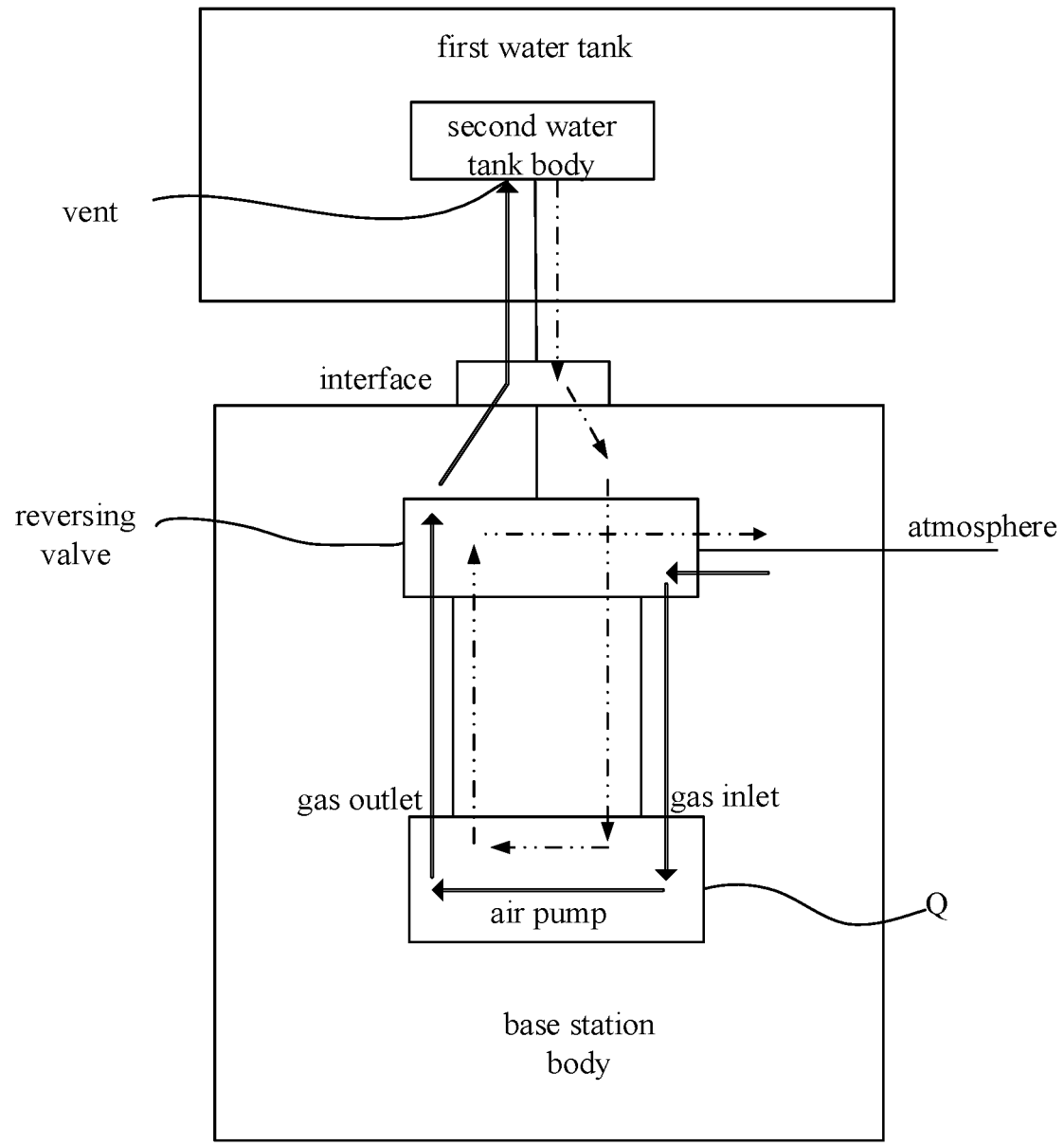
FIG. 14c is a gas circuit schematic diagram in the case the first water tank is installed on the base station body according to another exemplary embodiment of the present disclosure.

Referring to FIG. 12 and a gas circuit schematic diagram as shown in FIG. 14b, when the second water tank 2001 is installed on the base station body 210, the negative pressure interface 212 is communicated to the second water tank 2001, the docking port 215 of the positive pressure interface 211 is in a closed state, the gas pump draws gas from the negative pressure interface 212 during in working to provide negative pressure to the second water tank 2001, causing the second water tank 2001 to be in a negative pressure state for water inputting.

Figure 16A:
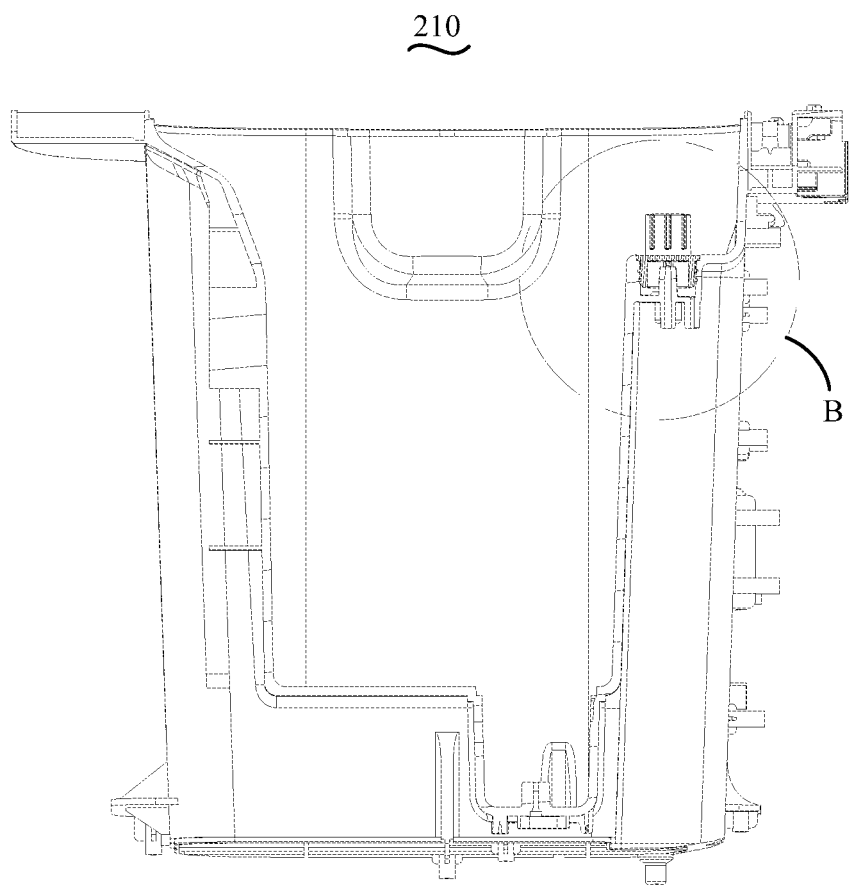
FIG. 16a is a cross-sectional view of the base station body according to a further exemplary embodiment of the present disclosure.
Figure 16B:
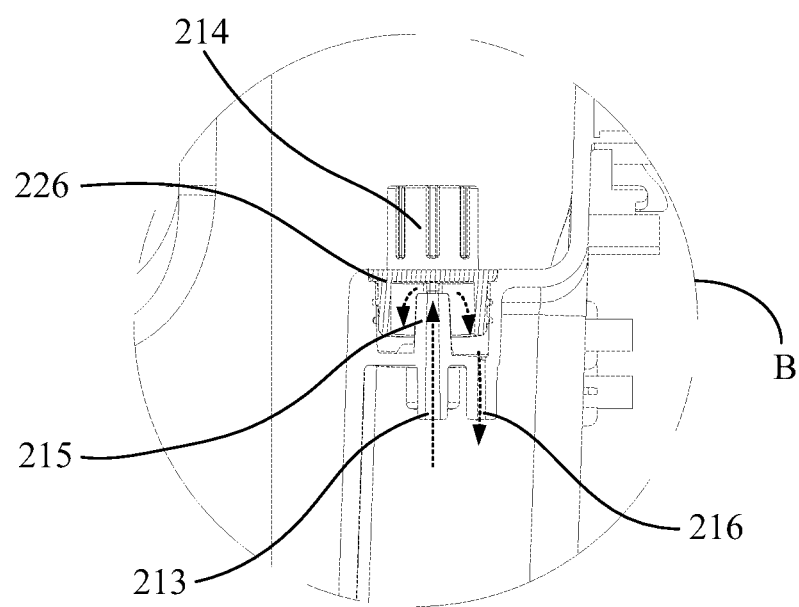
Figure 16C:
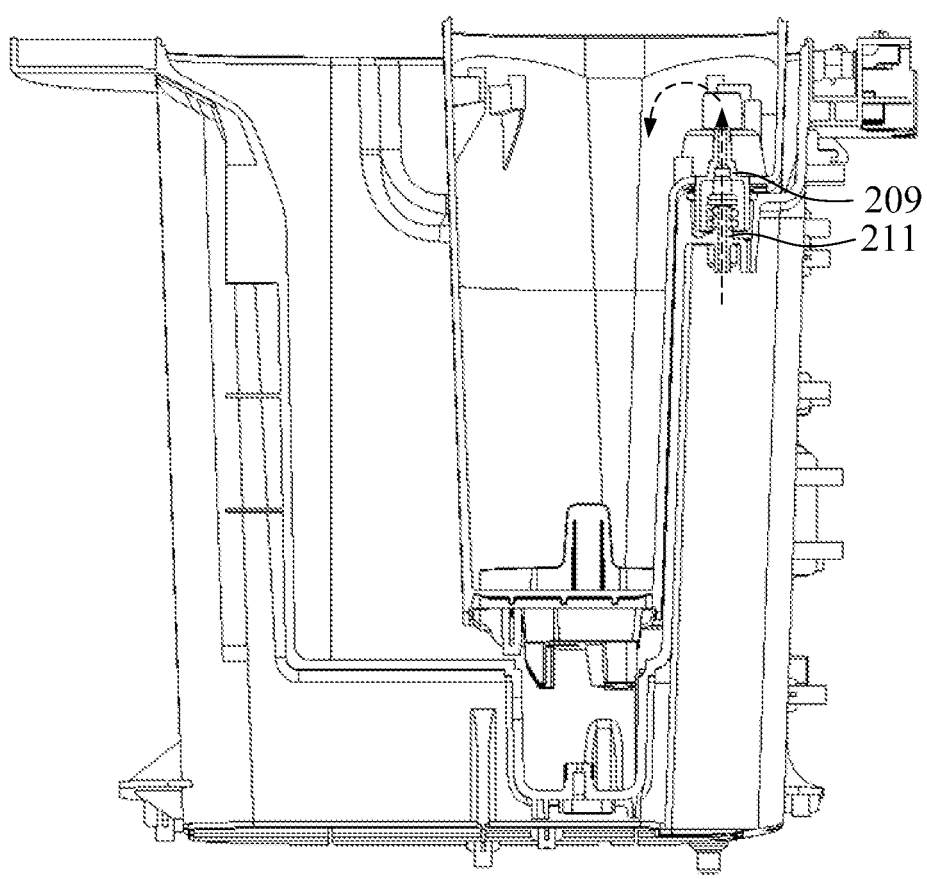
FIG. 16c is a cross-sectional view of the base station body with the air inlet connector of the first water tank connecting with the positive pressure interface according to another exemplary embodiment of the present disclosure.
Figure 16D:
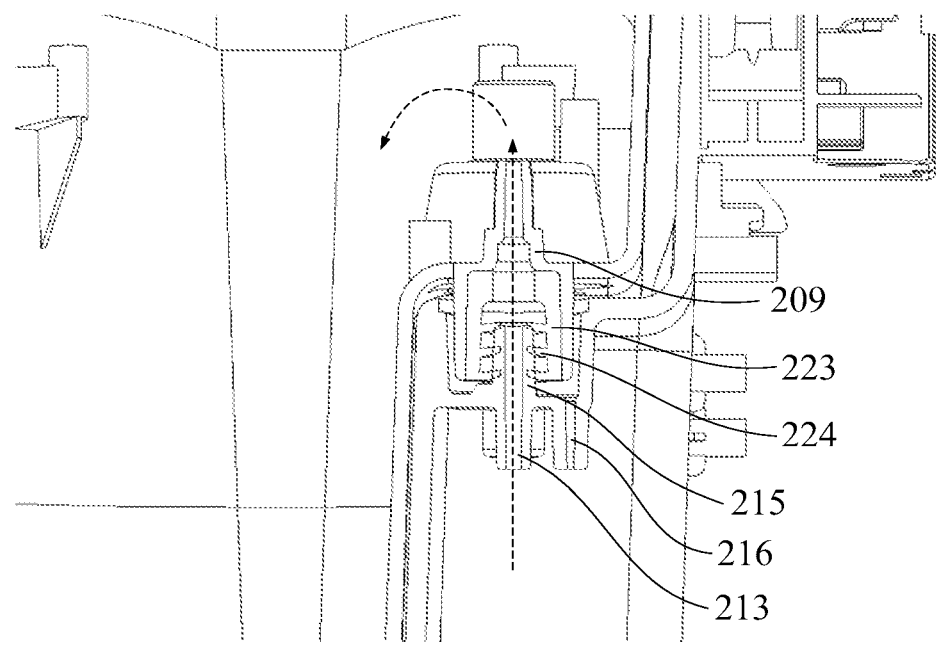
FIG. 16d is a schematic diagram of a part of structure in FIG. 16c.
Figure 16E:
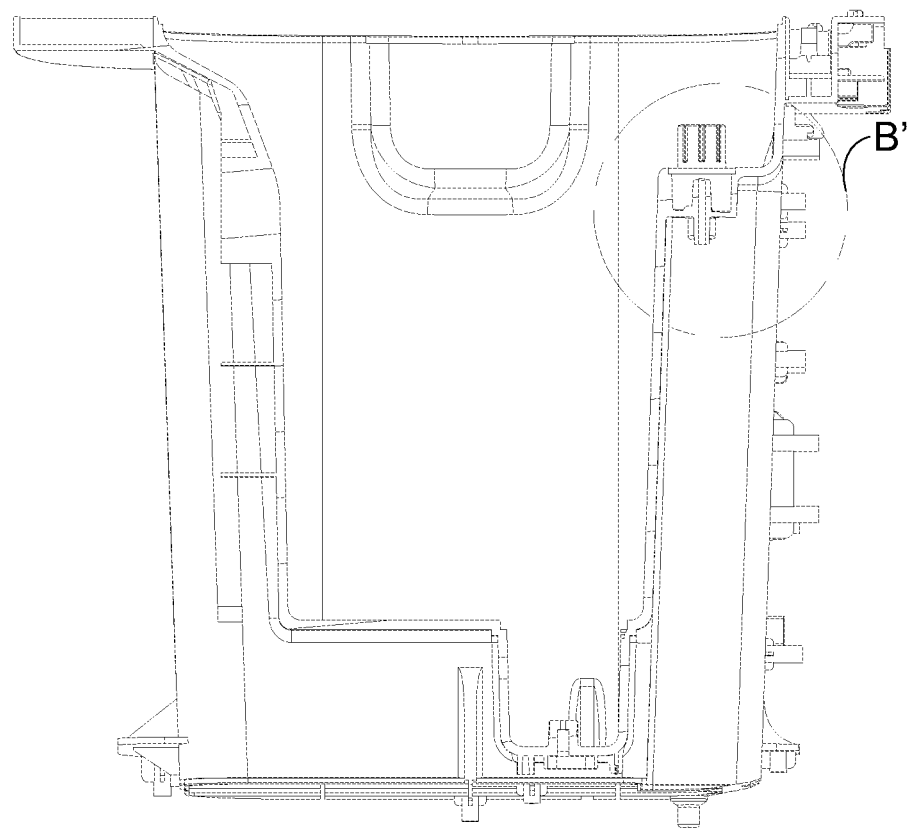
FIG. 16e is a schematic diagram of a base station body according to a further exemplary embodiment of the present disclosure.
Figure 16F:
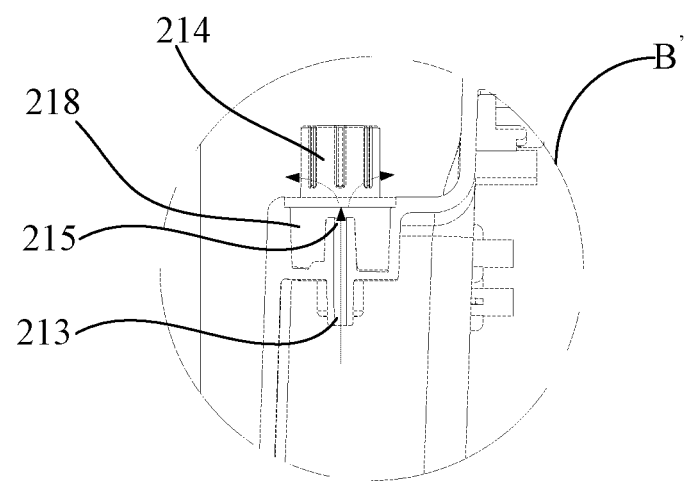
FIG. 16f is an enlarged view of portion B' in FIG. 16e.
Figure 16G:
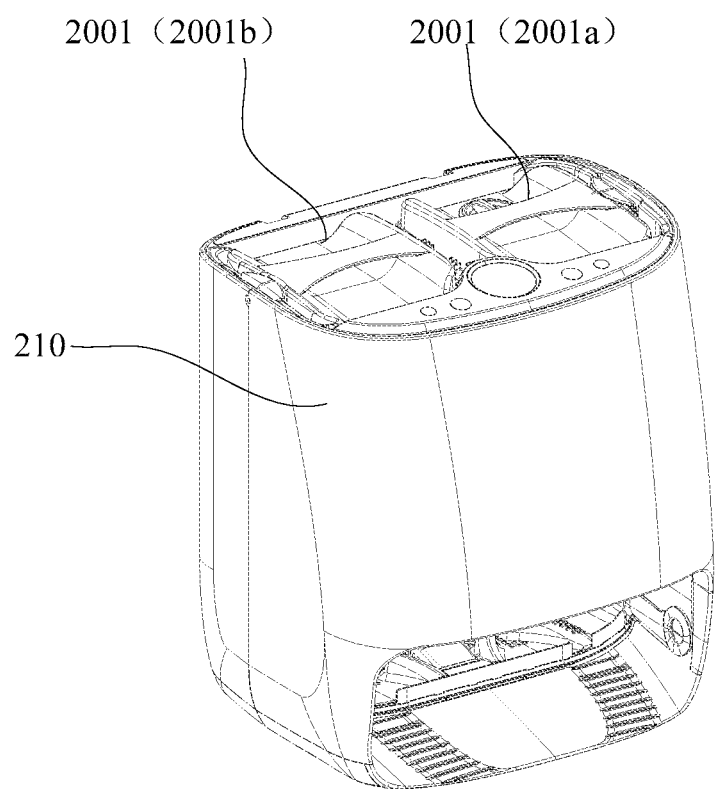
FIG. 16g is a schematic diagram of the second water tank being installed on the base station body according to an exemplary embodiment of the present disclosure.
Figure 16H:
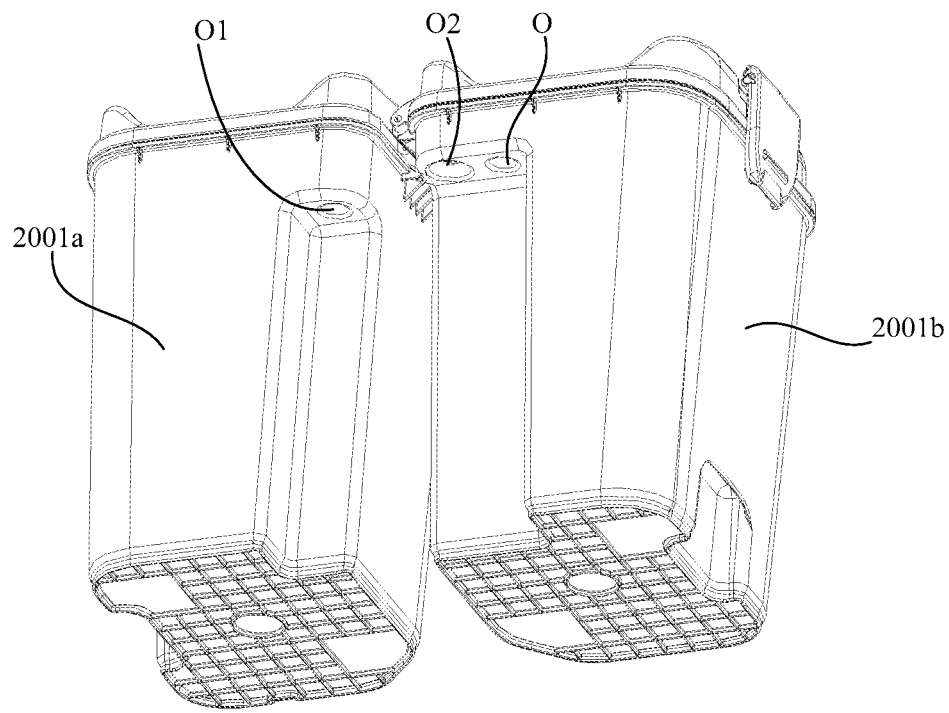
FIG. 16h is a schematic diagram of the second water tank according to an exemplary embodiment of the present disclosure.

As shown in FIG. 16h, the second water tank 2001 may include a clean water tank 2001a and a sewage tank 2001b, the clean water tank 2001a may be provided with a clean water waterway interface O1, the sewage tank 2001b may be provided with a sewage waterway interface O2 and a vent O, when the second water tank 2001 is installed on the base station body 210, the clean water waterway interface O1 of the second water tank 2001 is connected and communicated with a water outlet connector 2114 on the base station body 210, and the sewage waterway interface O2 is connected and communicated with a water inlet connector 214 on the base station body 210. The vent O of the second water tank 2001 is communicated with the negative pressure interface 212 on the base station body 210.

The base station body 210 includes a housing, optionally, the gas pump may be installed in the housing or be installed at an outer side of the housing, and the negative pressure interface 212 and the positive pressure interface 211 may be arranged on the surface of the housing, corresponding to the positions where the first water tank 201 and the second water tank 2001 are mounted on the base station body 210. By this way, when the first water tank 201 is installed on the base station body 210, the first water tank 201 is connected and communicated to the negative pressure interface 212 and the docking port 215 of the positive pressure interface 211; when the second water tank 2001 is installed on the base station body 210, the second water tank 2001 is connected and communicated to the negative pressure interface 212. In addition, the opening or closing of the docking port 215 of the positive pressure interface 211 may be achieved in various ways, for example, a cover plate adapted to the docking port 215 may be provided to block the docking port 215 to make the docking port 215 be closed, correspondingly, by removing the cover plate, the docking port 215 can be opened. Of course, this is only an illustrative embodiment, including but not limiting to this. The base station body 210 of the present disclosure can apply gas source to both the first water tank 201 and the second water tank 2001, that is, the first water tank 201 and the second water tank 2001 may share the gas source in the base station body 210, such that there is no need to set an additional gas source for the first water tank 201, which simplifies the structure and reduces the cost.

In some embodiments, referring to FIGS. 11a, 11b, 12, and 14a, the first water tank 201 has a water inlet 203 and a water outlet, the reversing valve 205 is respectively connected to the negative pressure interface 212, the positive pressure interface 211, the vent 202, and the atmospheric environment.

In case the negative pressure interface 212, the reversing valve 205 and the vent 202 are communicated, and the positive pressure interface 211 and the reversing valve 205 are communicated to the atmospheric environment, negative pressure would be formed inside the water storage cavity of the first water tank 201 for the first water tank 201 to store water through the water inlet;

in case the positive pressure interface 211, the reversing valve 205 and the vent 202 are communicated, and the negative pressure interface 212 and the reversing valve 205 are communicated to the atmospheric environment, positive pressure would be formed inside the water storage cavity of the first water tank 201 for the first water tank 201 to discharge water through the water outlet.

Apart from the vent 202, the first water tank 201 also includes the water inlet 203 and a water outlet 217. The water inlet 203 of the first water tank 201 is configured to communicate with the water inlet connector 214 of the base station body 210 through a water inlet pipe. Optionally, the reversing valve 205 may be communicated to the negative pressure interface 212 of the base station body 210 through a negative pressure suction pipe 219, communicated to the positive pressure interface 211 of the base station body 210 through a positive pressure gas inlet pipe 220, communicated to the vent 202 of the first water tank 201 through a vent pipe 221, and communicated to the atmospheric environment through an exhaust pipe 222.

The first water tank 201 communicates to a negative pressure gas circuit corresponding to the negative pressure interface 212, that is, the negative pressure interface 212, the reversing valve 205, and the vent 202 are communicated (namely, the negative pressure suction pipe 219 is communicated to the vent pipe 221); and the positive pressure interface 211 and the reversing valve 205 are communicated to the atmospheric environment (namely, the positive pressure gas inlet pipe 220 is communicated to the exhaust pipe 222). Gas in the water storage cavity C of the first water tank 201 passes through the vent 202, the vent pipe 221, the reversing valve 205 and the negative pressure suction pipe 219 successively to enter the negative pressure interface 212, then the gas enters the positive pressure interface 211 through the gas pump to further pass through the positive pressure gas inlet pipe 220, the reversing valve 205, and the exhaust pipe 222 to enter atmospheric environment. At the same time, negative pressure is formed inside the water storage cavity C of the first water tank 201, so that water can be pumped to the water storage cavity C of the first water tank 201 through the water inlet 203;

alternatively, the first water tank 201 is communicated to a positive pressure gas circuit corresponding to the positive pressure interface 211, that is, the positive pressure interface 211, the reversing valve 205, and the vent 202 are communicated (namely, the positive pressure gas inlet pipe 220 communicates with the vent pipe 221), the negative pressure interface 212 and the reversing valve 205 are communicated to the atmospheric environment (namely, the negative pressure suction pipe 219 is communicated to the exhaust pipe 222). Gas in the atmospheric environment enters the negative pressure interface 212 through the exhaust pipe 222, the reversing valve 205, and the negative pressure suction pipe 219, then enters the positive pressure interface 211 through the gas pump, and then enters the water storage cavity C of the first water tank 201 through the positive pressure gas inlet pipe 220, the reversing valve 205, the vent pipe 221, and the vent 202 successively. At the same time, positive pressure is generated inside the first water tank 201, so that fluid in the water storage cavity C of the first water tank 201 can be discharged through the water outlet 217.

Figure 13A:
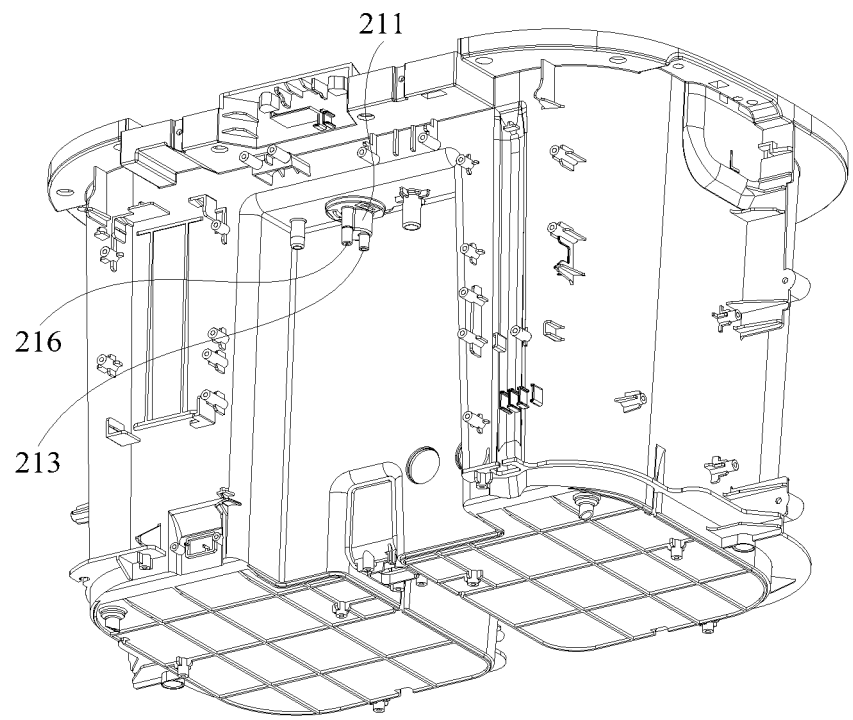
FIG. 13a is a schematic diagram of the base station body in FIG. 12 from another angle.
Figure 13B:
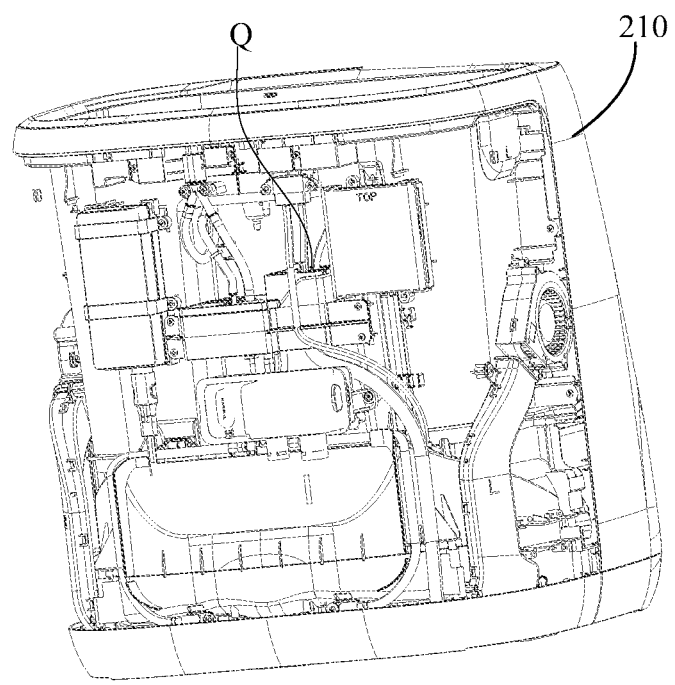
FIG. 13b is a schematic view of a base station with a rear housing being removed according to an exemplary embodiment of the present disclosure.
Figure 15A:
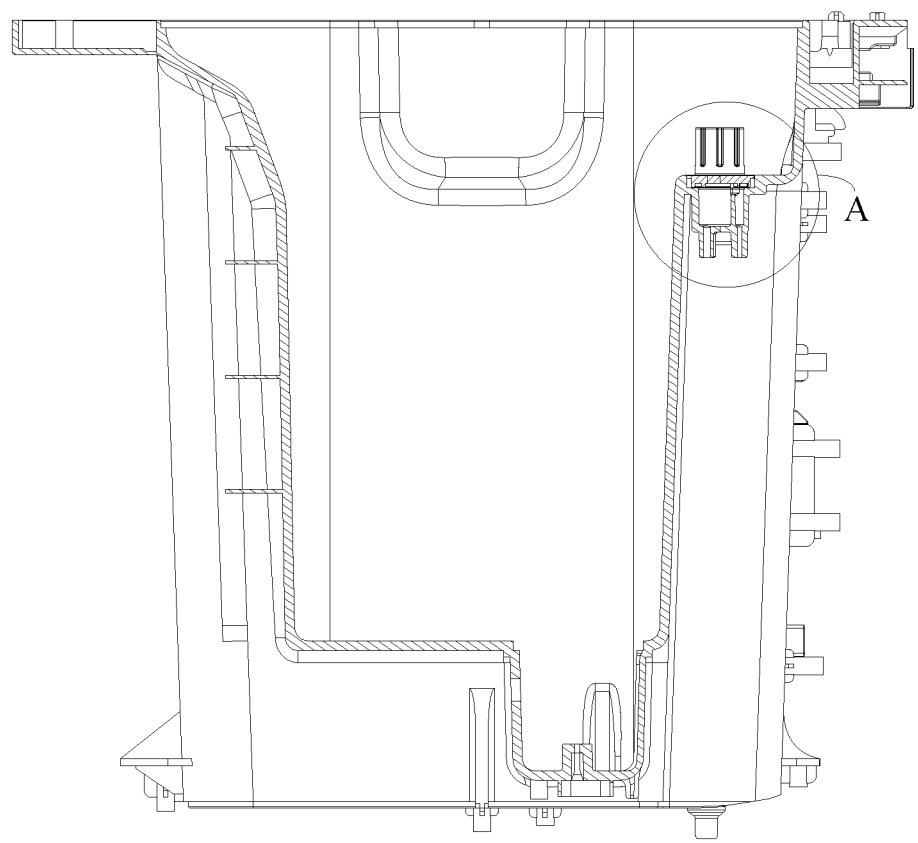
FIG. 15a is a cross-sectional view of the base station body in FIG. 12.
Figure 15B:
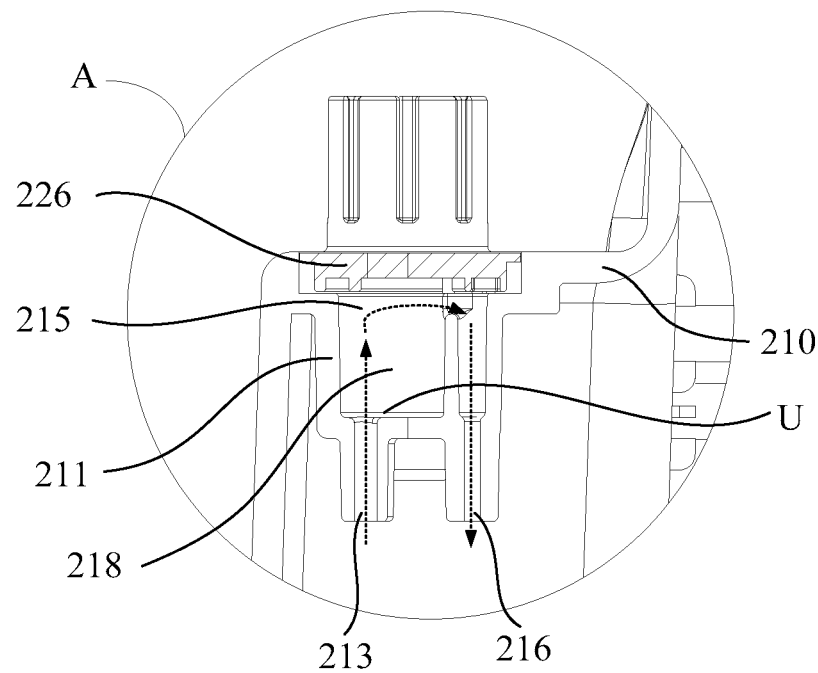

In some embodiments, referring to FIGS. 13, 15a, and 15b, the positive pressure interface 211 may further be provided with an exhaust port 216 communicated with the gas inlet 213;

when the first water tank 201 is installed on the base station body 210, the exhaust port 216 is in a closed state, and gas from the gas pump enters the first water tank 201 from the gas inlet 213, the docking port 215, and the reversing valve 205;

when the second water tank 2001 is installed on the base station body 210, gas from the gas pump is discharged into the atmosphere through the gas inlet 213 and the exhaust port 216.

Figure 15C:
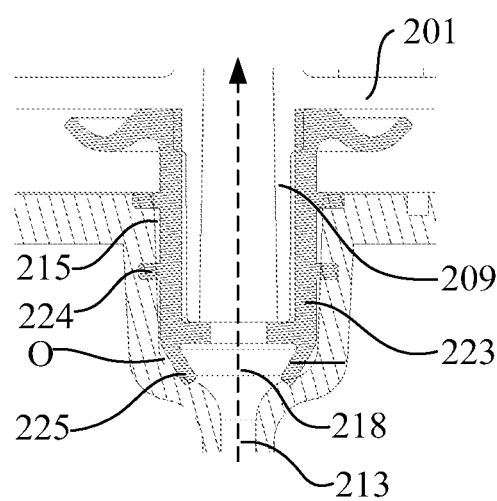
FIG. 15c is a schematic diagram of an air inlet connector of the first water tank connecting with a positive pressure interface according to an exemplary embodiment of the present disclosure.
Figure 15D:
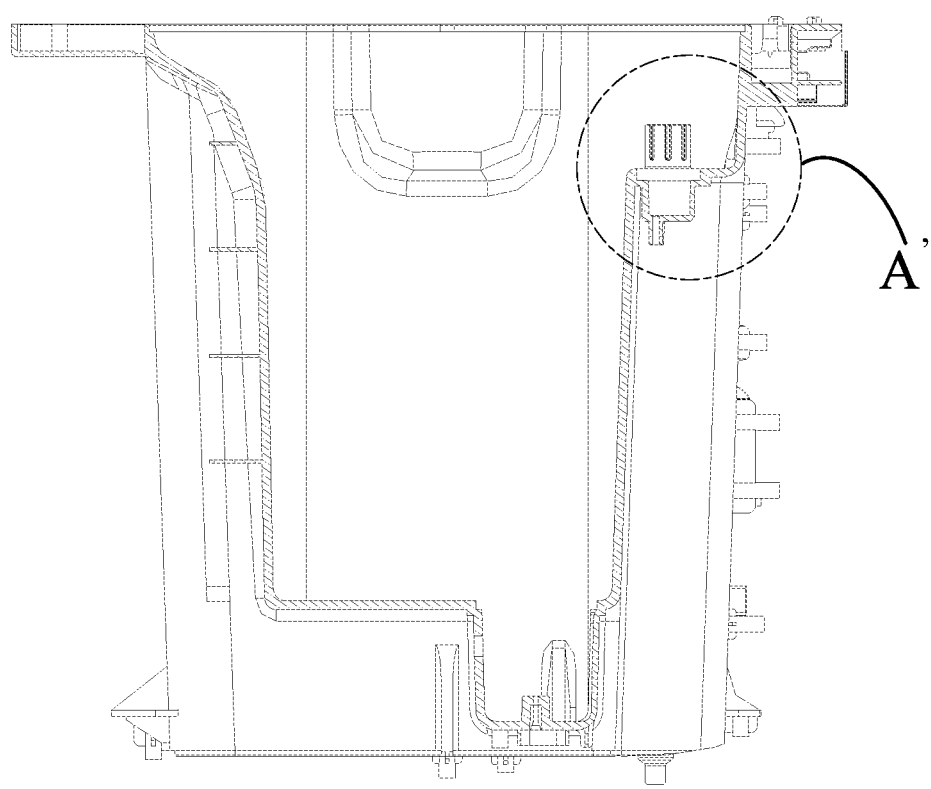
FIG. 15d is a cross-sectional view of the base station body according to another exemplary embodiment of the present disclosure.
Figure 15E:
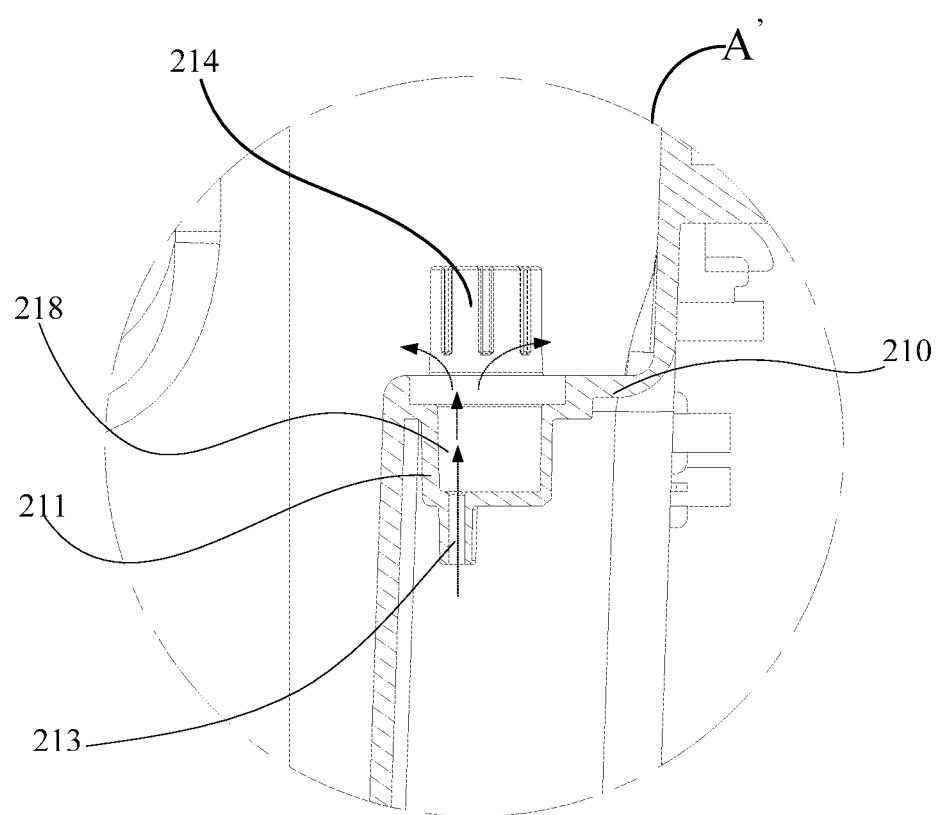
FIG. 15e is an enlarged view of portion A' in FIG. 15d.

In some other embodiments, as shown in FIG. 15d to FIG. 15e, the exhaust port 216 may be omitted. When the second water tank 2001 is installed on the base station body 210, gas from the gas pump enters the positive pressure interface from the gas inlet 213, and then flows directly to the atmosphere from an upper opening of the positive pressure interface.

When the first water tank 201 is installed on the base station body 210, the exhaust port 216 is closed, and gas from the gas pump enters the first water tank 201 from the gas inlet 213, the docking port 215, and the reversing valve 205. In the current state, the exhaust port 216 is closed, which ensures that the gas entering to the positive pressure interface 211 through the gas inlet 213 can be transported to the first water tank 201 through the docking port 215. Then, the first water tank 201 switches the gas circuit through the reversing valve 205, to select communicating the negative pressure gas circuit corresponding to the negative pressure interface 212, causing the water tank to be in a negative pressure state to suck water; or select communicating the positive gas circuit corresponding to the positive pressure interface 211, causing the water tank to be in a positive pressure state to discharge water. When the second water tank 2001 is installed on the base station body 210, gas from the gas pump may be discharged into the atmosphere from the gas inlet 213 and the exhaust port 216. The gas transported by the gas pump to the positive pressure interface 211 can be released to the atmospheric environment through the exhaust port 216, which ensures a normal work of the gas pump. The opening or closing of the exhaust port 216 may be realized in various ways. For example, when the first water tank 201 is installed on the base station body 210, the gas inlet connector on the first water tank 201 for docking with the positive pressure interface 211 may close the exhaust port 216. Alternatively, a cover plate or the like adapted to the exhaust port 216 may be provided to block the exhaust port 216 to make the exhaust port 216 be in a closed state. Correspondingly, removing the cover plate can open the exhaust port 216. It should be understood that, this is only illustrative, including but not limiting to this.

In some embodiments, referring to FIGS. 15a to 15c, the positive pressure interface 211 further includes a concave portion U defined on the base station body 210, and the concave portion U defines a communicating cavity 218;

the communicating cavity 218 is configured to communicate with the gas inlet 213, the docking port 215, and the exhaust port 216 respectively;

in case the second water tank 2001 is installed on the base station body 210, gas from the gas pump first enters the communicating cavity 218 from the gas inlet 213, and then is discharged into atmosphere through the exhaust port 216 (the dashed arrow in FIG. 15b shows a gas flow path in the positive pressure interface 211, in the case the second water tank 2001 is installed on the base station body 210).

When the first water tank 201 is installed on the base station body 210, the docking port 215 is in an open state (as shown in FIG. 15c), the exhaust port 216 is in a closed state, and gas from the gas pump enters the first water tank 201 from the gas inlet 213, the docking port 215, and the reversing valve 205 (the dashed arrow in FIG. 15c shows a gas flow path in the positive pressure interface 211, in the case the first water tank 201 is installed on the base station body 210). When the second water tank 2001 is installed on the base station body 210, the docking port 215 of the positive pressure interface 211 is in a closed state, the exhaust port 216 is in an open state, and gas from the gas pump enters the communicating cavity 218 through the gas inlet 213 and then be discharged into atmosphere through the exhaust port 216.

In some embodiments, referring to FIG. 15b, the maximum cross-sectional area of the gas channel of the gas inlet 213 is smaller than the maximum cross-sectional area of the gas channel of the communicating cavity 218, and the maximum cross-sectional area of the gas channel of the communicating cavity 218 is larger than the maximum cross-sectional area of the gas channel of the exhaust port 216.

The cross-sections of the gas channels of the gas inlet 213, the communicating cavity 218, and the exhaust port 216 are all perpendicular to the flow direction of the gas. The gas from the gas pump enters the communicating cavity 218 through the gas inlet 213 (the cross-section of the gas channel changes from small to large), and then flows to the exhaust port 216 from the communicating cavity 218 (the cross-section of the gas channel changes from large to small) to be discharged into the atmosphere. After several times of the changing of the cross-sectional area of the gas channel, gas sound wave is reflected at the position where the cross-section abruptly changes and noise is attenuated, thereby a noise reduction of the gas is achieved. Therefore, the positive pressure interface 211 may achieve noise reducing by way of designing a reasonable structure for it.

In some embodiments, referring to FIGS. 15b to 16d, the docking port 215 is a concave docking port 215, the first water tank 201 includes a protruding gas inlet connector 209, and the gas inlet connector 209 can be inserted into the concave docking port 215 to communicate with the concave docking port 215; or, as shown in FIGS. 16a and 16b, the docking port 215 is a convex docking port 215. The convex docking port 215 is located in the concave portion, and protrudes upwards from the bottom of the concave portion, the first water tank 201 includes a convex gas inlet connector 209, and the convex docking port 215 can be inserted into the gas inlet connector 209 to communicate with the gas inlet connector 209.

The docking port 215 for the first water tank 201 and the positive pressure interface 211 can be a convex docking structure or a concave docking structure. As shown in FIG. 15b and FIG. 15c, the gas inlet connector 209 provided to the first water tank 201 is a convex gas inlet connector, which can be engaged to the concave docking port 215 of the positive pressure interface 211 to communicate with the concave docking port 215. Alternatively, the docking port 215 for the first water tank 201 and the positive pressure interface 211 can be a concave docking structure or a convex docking structure. As shown in FIG. 16b to FIG. 16d, the gas inlet connector 209 provided to the first water tank 201 is a convex gas inlet connector 209, which can be engaged to the convex docking port 215 of the positive pressure interface 211 to communicate with the convex docking port 215. It can select one of the two docking structures according to an actual situation.

Similarly, when the docking port is a convex docking port 215, as shown in FIGS. 16e to 16f, the exhaust port 216 of the positive pressure interface may also be omitted. When the second water tank 2001 is installed on the base station body 210, gas from the gas pump will enter the positive pressure interface from the gas inlet 213, and then flows directly to the atmospheric environment through an upper opening of the positive pressure interface.

In some embodiments, referring to FIGS. 15c and 16d, the base station body 210 is further provided with a sealing member 223, and the sealing member 223 may be positioned between the docking port 215 and the gas inlet connector 209.

The sealing member 223 is configured to realize a sealing between the first water tank 201 and the positive pressure interface 211 to ensure a gas tightness, and prevent gas from leaking from the gap between the first water tank 201 and the positive pressure interface 211. Wherein, the sealing member 223 may have different structures corresponding to a concave docking port 215 or a convex docking port 215 of the positive pressure interface 211.

Further, referring to FIG. 15c, in case the docking port 215 is a concave docking port 215, the sealing member 223 may be sleeved on an outer peripheral wall of the gas inlet connector 209, and abutted the inner side wall of the concave docking port 215;

as shown in FIG. 16d, in case the docking port 215 is a convex docking port 215, the sealing member 223 is arranged on an inner peripheral wall of the gas inlet connector 209, and abutted the outer side wall of the convex docking port 215.

As shown in FIG. 15c, in case the docking port 215 is the concave docking port 215, the sealing member 223 is sleeved on the gas inlet connector 209, so that when the gas inlet connector 209 is coupled with the concave docking port 215, the sealing member 223 resists against the inner side wall of the concave docking port 215, which prevents the gas in the positive pressure interface 211 introduced by the gas pump from leaking to the atmospheric environment from the gap between the outer peripheral wall of the gas inlet connector 209 and the inner side wall of the concave docking port 215, thereby gas tightness is ensured. As shown in FIG. 16d, in case the docking port 215 is the convex docking port 215, the sealing member 223 is arranged on the inner peripheral wall of the gas inlet connector 209, so that when the gas inlet connector 209 is coupled with the convex docking port 215, the sealing member 223 resists against the outer side wall of the convex docking port 215, which prevents the gas in the positive pressure interface 211 introduced by the gas pump from leaking to the atmosphere from the gap between the outer peripheral wall of the convex docking port 215 and the inner side wall of the gas inlet connector 209.

Further, as shown in FIG. 15c, the docking port 215 is a concave docking port 215, the sealing member 223 may be provided with a plurality of annular protrusions 224 protruded on an outer peripheral wall of the sealing member 223, and the annular protrusions 224 resist against the inner side wall of the concave docking port 215;

as shown in FIG. 16d, the docking port 215 is a convex docking port 215, the sealing member 223 may be provided with a plurality of annular protrusions 224 protruded on an inner peripheral wall of the sealing member 223, and the annular protrusions 224 resist against the outer side wall of the convex docking port 215.

The sealing member 223 is provided with a plurality of annular protrusions 224, the plurality of annular protrusions 224 are arranged at intervals on the outer peripheral wall of the sealing member 223, and may be integrally formed with the sealing member 223. When the gas inlet connector 209 is coupled with the docking port 215, the sealing member 223 resists against the side wall of the docking port 215 by way of the annular protrusions 224, which can achieve a multi-stage sealing to further improve the gas tightness.

In some embodiments, referring to FIG. 15c, the docking port 215 is a concave docking port 215, the sealing member 223 is defined with an extending portion 225 which is located at an end of the sealing member 223 facing the concave docking port 215, the extending portion 225 and the concave docking port 215 cooperatively defines a deformation cavity O between the extending portion 225 and an inner side wall of the concave docking port 215. The extending portion 225 deforms towards the deformation cavity O when there is gas passing through.

In an exemplary embodiment, the extending portion 225 of the sealing member 223 may have a shape like a hollow round table which extends and converges towards the center line of the sealing member 223. As shown in FIG. 15c, when gas from the gas pump enters into the positive pressure interface 211, the extending portion 225 of the sealing member 223 deforms towards the deformation cavity O due to a pressure from the gas, which has a tendency to cling to the inner side of the concave docking port 215, which can further improve the gas tightness.

In some embodiments, referring to FIGS. 12, 15b, and 16b, the base station body 210 further includes:

a covering member 226, the covering member 226 is movably or detachably connected to the docking port 215 to close or open the docking port 215.

When the first water tank 201 is installed on the base station body 210, the covering member 226 is removed to open the docking port 215, allowing the first water tank 201 to be connected and communicated with the docking port 215, then gas can be supplied to the first water tank 201 through the positive pressure interface 211; when the second water tank 2001 is installed on the base station body 210, the covering member 226 closes the docking port 215 since the second water tank 2001 does not need to communicate to the positive pressure interface 211.

Optionally, the covering member 226 can be movably connected with the docking port 215 in various ways. For example, the covering member 226 is a cover plate, and is slidably or rotatably arranged at the docking port 215, which is not limited here; or, the covering member 226 may be detachably connected to the docking port 215 in various ways, for example, the covering member 226 is a cover plate connected to the docking port 215 by buckle or fasteners; or, the covering member 226 is a rubber plug interference fitting with the docking port 215, which is not limited here.

In some embodiments, referring to FIGS. 15b and 16b, the covering member 226 is configured to be installed at the opening of the concave portion, to obstruct gas from flowing out of the docking port 215, allowing the gas from the gas inlet 213 to pass through the communicating cavity 218 and then to be discharged from the exhaust port 216.

In some embodiments, the covering member 226 includes a rigid member and/or an elastic plug, it can be selected according to actual need. Further, there is no restriction to the shape of the covering member 226.

The present disclosure also provides a cleaning system, which includes the base station and the cleaning apparatus as described in the foregoing embodiments. The structure of the base station can be referred to the above-mentioned embodiments. Since the cleaning system adopts all the technical solutions of the above-mentioned embodiments, it has at least all the technical effects brought by the technical solutions of the above-mentioned embodiments, which is not repeated here.

By way of creative work, the inventor found that gas source can be used as a power source to realize an automatic suction and drainage for the water tank. Gas pipes and valves are arranged between the gas source and the water tank, the valves are configured to switch gas circuit of the gas pipes, sewage can be sucked when negative pressure is applied by the gas source, and the sewage can be discharged when positive pressure is applied by the gas source.

Two two-position three-way solenoid valves are commonly used to control the switch of gas circuit in the gas pipelines of the water tank, which is not only high cost, but also results in a complicated arrangement of the gas pipelines. As a result, the gas pipelines are prone to be installed incorrectly to affect a normal use.

Figure 17:
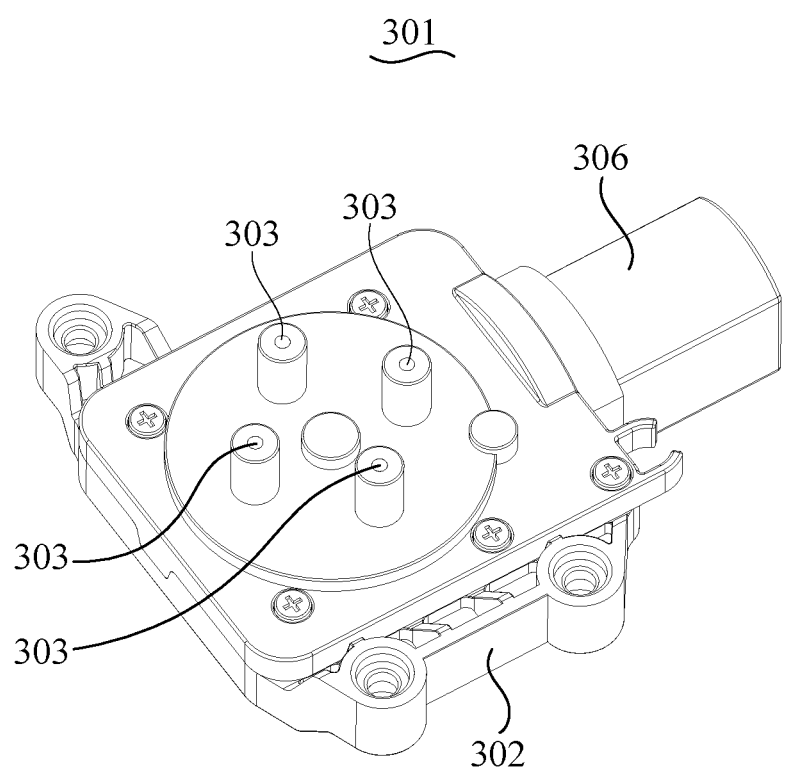
FIG. 17 is a schematic diagram of a reversing valve according to an exemplary embodiment of the present disclosure.
Figure 18:
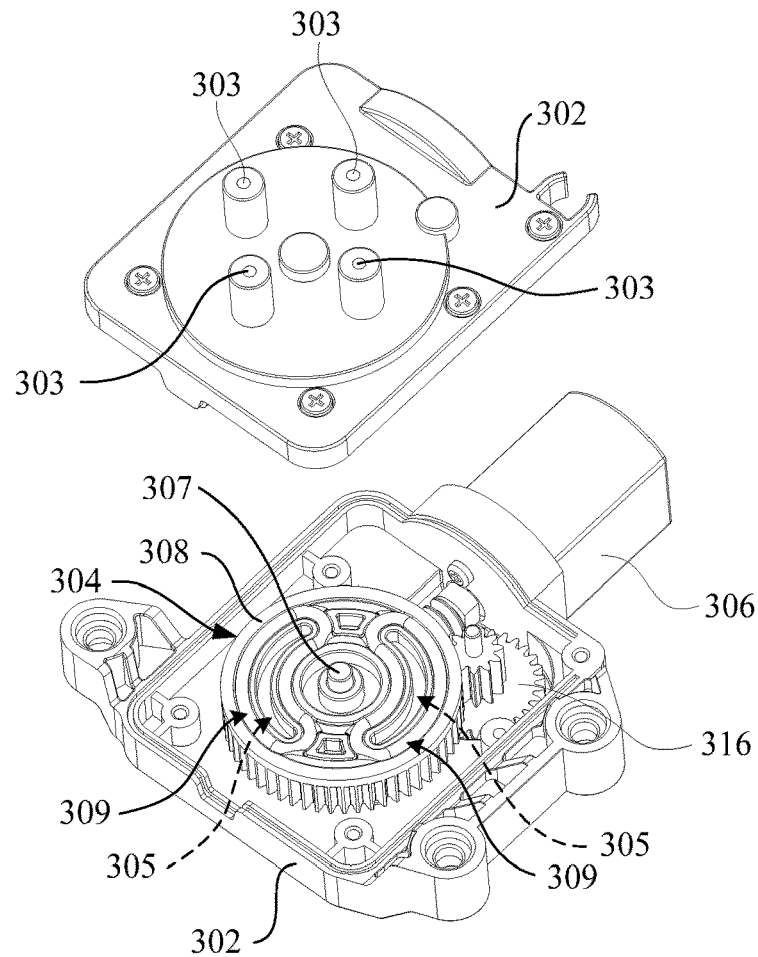
FIG. 18 is a first exploded view of the reversing valve in FIG. 17.
Figure 19:
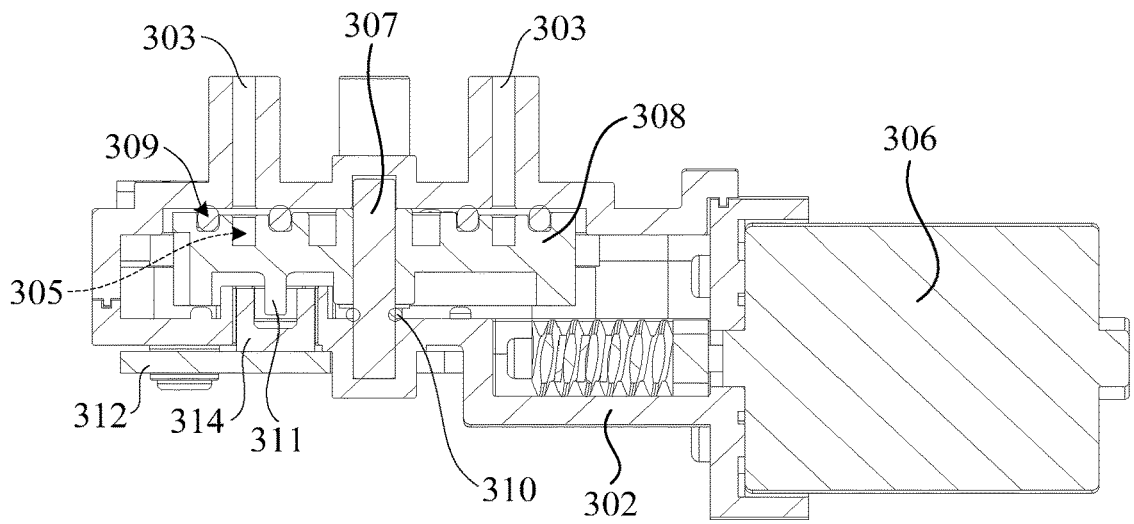
FIG. 19 is a cross-sectional view of the reversing valve in FIG. 17.

Referring to FIGS. 17 to 19, the present disclosure further provides a reversing valve 301. The reversing valve 301 includes:

a housing 302, a surface of the hosing 302 is defined with at least four gas holes 303;

a reversing member 304 movably arranged in the housing, the reversing member 304 is defined with at least two independent channels 305, and each channel 305 communicates with two of the gas holes 303;

a driving member 306 arranged on the housing 302 and is in driving connection with the reversing member 304. The driving member 306 drives the reversing member 304 to move to switch the communication between the channel 305 and different gas holes 303.

The reversing valve 301 of the embodiment can be applied to the base station of the cleaning system to switch gas circuit of the water tank, causing the water tank to be in a negative pressure state for water inputting or in a positive pressure state for water discharging. Of course, the reversing valve 301 can also be applied in other application scenarios. The housing 302 of the reversing valve 301 may include a first housing and a second housing which are detachably connected with each other. The first housing and the second housing are coupled together and cooperatively define an inner accommodating cavity. Screws and buckled can be used to detachably connect the first housing and the second housing, which can be selected according to actual need.

The reversing member 304 is located in the accommodating cavity of the housing 302, the gas holes 303 of the housing 302 is configured for connecting with external gas pipes and penetrate into the housing 302 for communicating with the channel 305 of the reversing member 304. The channel 305 has an opening defined on a surface of the reversing member 304, for the channel 305 to communicate with the gas hole 303 inside the housing 302. There are at least four gas holes 303 and at least two channels 305, the two channels 305 are independent with each other, and each channel 305 communicates with two of the gas holes 303. That is, the number of gas holes 303 may be four, six, or eight. For example, in case there are four gas holes 303, two channels 305 may be provided correspondingly, one channel 305 communicates with two adjacent gas holes 303, and the other channel 305 communicates with the other two adjacent gas holes 303. In case there are six gas holes 303, three channels 305 may be provided correspondingly, adjacent two of the six gas holes 303 form a pair of gas holes, and the three pairs of gas holes are respectively communicated with one of the channels 305. Eight or other numbers of gas holes can be set according to this. By way of the channel 305, each two gas holes 303 are communicated, gas flowing in one of the gas holes 303 may flow through the channel 305 to the other gas hole 303 and then flow out.

The driving member 306 drives the reversing member 304 to move, so the channel 305 of the reversing member 304 changes positions correspondingly, thereby switching the communication between the channel 305 and different gas holes 303. The reversing member 304 may rotate to make a movement, or make a translational movement (i.e., parallel translation). For example, in case the reversing member 304 is rotated to make a movement, the gas holes 303 may be arranged at intervals on the housing 302 along a circumferential direction of the housing 302, and the channels 305 are correspondingly arranged in the reversing member 304 in turn along the circumferential direction; correspondingly, the driving member 306 may be a motor or other power source which drives the reversing member 304 through a gear set or a worm gear or a transmission belt. In case the reversing member 304 makes a parallel translation, the gas holes 303 on the housing 302 may be arranged at intervals in a straight line, the channels 305 are correspondingly arranged in a straight line in the reversing member 304, and the driving member 306 may be a cylinder or a motor or other power source. In case a motor is selected, the driving member 306 may drive the reversing member 304 through a leading screw or a gear and rack or a friction wheel. In addition, no matter what kind of movement of the reversing member 304 makes and what kind of transmission structures is used, the motor as the driving member 306 may be fixed on the housing 302 or fixed on the reversing member 304, which can be selected according to an actual need.

The principle of switching the gas circuit of the reversing valve 301 is: a channel 305 in the reversing member 304 of the reversing valve 301 communicates with two of the gas holes 303, thereby two gas pipes with each connecting to one of the two gas holes 303 communicates with each other; the driving member 306 of the reversing valve 301 drives the reversing member 304 to move to change the position of the channel 305, thereby switching off at least one of the two gas holes 303 that is communicated with the channel 305, making the channel 305 to communicate with another gas hole 303. As such, different gas pipes can be switched to be communicated to realize gas circuit switching.

When the reversing valve 301 is applied to the base station of the cleaning system, the gas pipeline, which is configured for the water tank, includes the positive pressure gas inlet pipe, the vent pipe, the negative pressure suction pipe, and the exhaust pipe, one end of each of the four is connected to one of the four different gas holes 303 of the reversing valve 301, and the other end of the positive pressure gas inlet pipe is configured for gas inputting, the other end of the vent pipe is connected to the water tank, the other end of the negative pressure suction pipe is configured for gas outputting, and the other end of the exhaust pipe is communicated to the atmospheric environment.

The gas circuit is switched by the reversing valve 301, the negative pressure suction pipe is communicated with the vent pipe, the positive pressure gas inlet pipe is communicated with the exhaust pipe, gas in the water tank enters the negative pressure suction pipe through the vent pipe and the reversing valve 301 successively, causing a negative pressure to be formed inside the water tank for water inputting; gas in the positive pressure gas inlet pipe passes through the reversing valve 301 and the exhaust pipe successively to be discharged into the atmospheric environment;

when the positive pressure gas inlet pipe is communicated with the vent pipe and the negative pressure suction pipe is communicated with the exhaust pipe, gas in the positive pressure gas inlet pipe enters the water tank through the reversing valve 301 and the vent pipe successively, causing a positive pressure to be formed inside the water tank for water discharging; gas in the atmospheric environment enters the negative pressure suction pipe through the exhaust pipe and the reversing valve 301 successively.

A single valve of the present disclosure will solve the problems solved by the existing two two-position three-way solenoid valves, which reduces the number of the valve and reduces the cost. Further, the reversing valve 301 only needs to connect the positive pressure gas inlet pipe, the vent pipe, the negative pressure suction pipe and the exhaust pipe, such that the number of pipes of the pipeline is reduced, the arrangement for the pipeline becomes simple and misfitting will be reduced, and the cost is further reduced.

In some embodiments, referring to FIGS. 18 and 19, the reversing member 304 includes:

a mounting shaft 307, rotatably arranged in the housing 302;

a turnplate 308, mounted on the mounting shaft 307, and the turnplate 308 is defined with at least two channels 305 on the surface of the turnplate 308;

the at least four gas holes 303 are arranged at intervals and around the axis of the mounting shaft 307 on the surface of the housing 302.

The reversing member 304 is a rotating structure, the mounting shaft 307 is rotatably arranged in the housing 302. Each one of two facing inner surfaces of the housing 302 is defined with a groove configured for the mounting shaft 307 to be inserted and mounted. The mounting shaft 307 can rotate around its axis in the groove. The turnplate 308 is installed on the mounting shaft 307 to rotate with the mounting shaft 307, and located between the two facing inner surfaces of the housing 302. Since the reversing member 304 is a rotating structure, the gas holes 303 are arranged on the surface of the housing 302 at intervals and around the axis of the mounting shaft 307, and located on the moving path of the channel 305, when the turnplate 308 rotates a preset angle, the gas holes 303 are communicated with the channel 305 of the turnplate 308.

In some embodiments, referring to FIG. 18 and FIG. 19, the at least two channels 305 are spaced apart on the turnplate 308 and arranged along the circumference of the turnplate 308, and the reversing valve 301 further includes:

a sealing member 309, the sealing member 309 is embedded in the turnplate 308 and located at the periphery of the opening of the channel 305 to seal the channel 305.

Since the reversing member 304 is a rotating structure, the channels 305 are arranged along the circumference of the turnplate 308 at intervals, when the turnplate 308 rotates by a preset angle, one of the channels 305 reaches the position corresponding to a certain gas hole 303 and connects with the gas hole 303, thus realizing a communication between the channel 305 and the gas hole 303. The channel 305 may be an arc-shaped channel, a fan-shaped channel, or other shaped channel, which may be selected according to actual need. In addition, the sealing member 309 is embedded in the turnplate 308 and is located at the periphery of the opening of the channel 305, such that the sealing member 309 can resist against the inner surface of the housing 302 to sealing the channel 305. When the turnplate 308 rotates to change the position of the channel 305, the sealing member 309 moves correspondingly, and when the opening of the channel 305 reaches the position corresponding to the gas hole 303 to communicate with the gas hole 303, the sealing member 309 automatically provides a sealing between the channel 305 and the gas hole 303, thereby ensuring the gas tightness. Preferably, the sealing element 309 is a sealing ring.

Of course, in other embodiments, the sealing member 309 can also be arranged on the inner surface of the housing 302 to maintain resisting against the surface of the turnplate 308, which can be selected according to actual situation.

In some embodiments, referring to FIG. 19, the reversing valve 301 further includes:

an elastic ring 310 sleeved on the mounting shaft 307 and sandwiched between the surface of the turnplate 308 away from the sealing member 309 and the surface of the housing 302.

The elastic ring 310 elastically resists against the surface of the turnplate 308 away from the sealing member 309 and the surface of the housing 302 respectively, on the one hand, it can absorb the assembly tolerance of the housing 302 to ensure a smooth rotation of the turnplate 308, on the other hand, an elastic force can be applied to the sealing member 309 indirectly through the turnplate 308, such that the sealing member 309 is always bearing a certain degree of pressure, which further improves the gas tightness.

Figure 20:
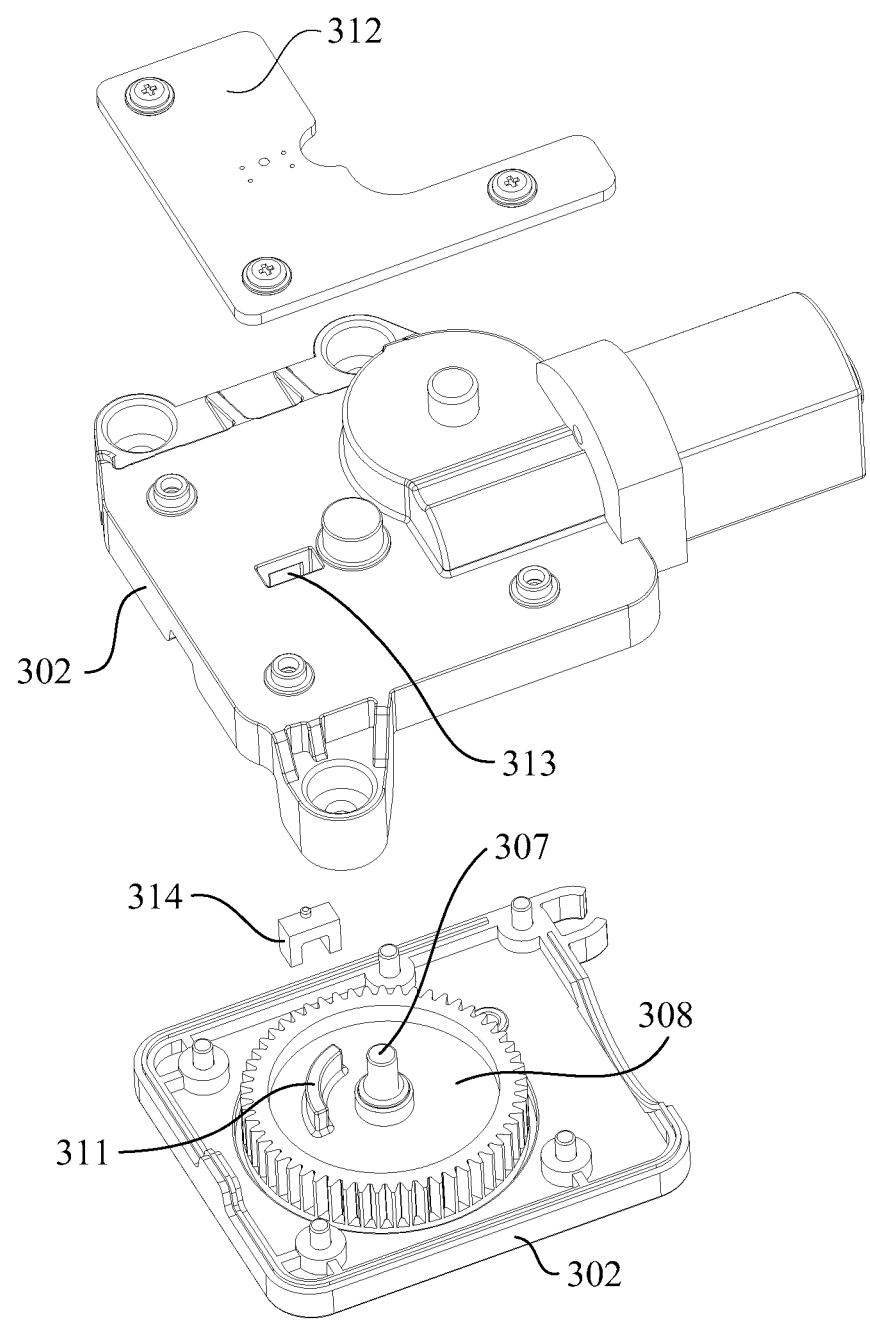
FIG. 20 is a second exploded view of the reversing valve in FIG. 17.
Figure 21:
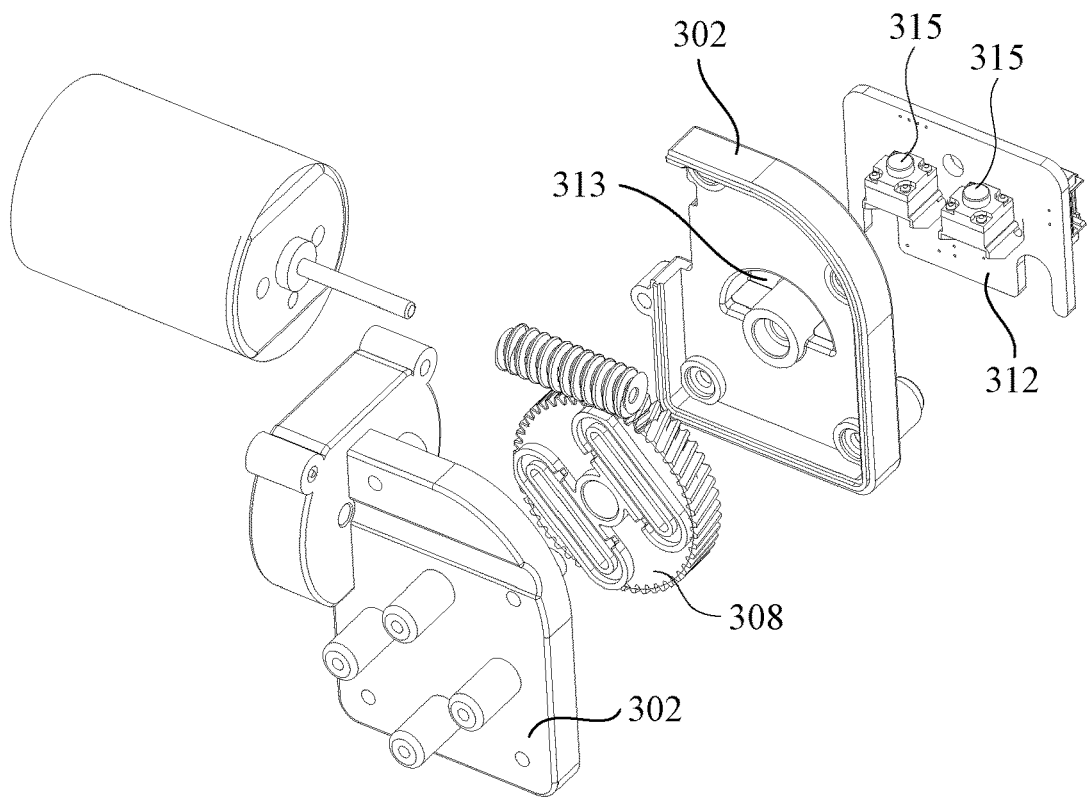
FIG. 21 is an exploded view of a reversing valve according to an exemplary embodiment of the present disclosure.

In some embodiments, referring to FIGS. 19 to 21, the reversing member 304 further includes a trigger protrusion 311 and a detecting member, one of the trigger protrusion 311 and the detecting member is arranged on the turnplate 308, and the other is arranged on the housing 302;

wherein, after the turnplate 308 is rotated by a preset angle, the trigger protrusion 311 triggers the detecting member, causing the detecting member to send an electrical signal.

When the turnplate 308 rotates relative to the housing 302, the trigger protrusion 311 cooperates with the detecting member to determine the rotation angle and rotating positions of the turnplate 308. A control circuit board 312 may be provided, and the detecting member is electrically connected to the control circuit board 312. As such, after the turnplate 308 is rotated by a preset angle and causes the channel 305 of the turnplate 308 switching to communicate with different gas holes 303, the detecting member is triggered by the trigger protrusion 311, and the control circuit board 312 receives the electrical signal of the detecting member to control the driving member 306 to stop the rotation of the turnplate 308, realizing a gas circuit switching. The trigger protrusion 311 is arranged on the turnplate 308, and the detecting member is arranged on the housing 302; or the detecting member is arranged on the turnplate 308, and the trigger protrusion 311 is arranged on the housing 302, which may be selected according to actual need.

In some embodiments, referring to FIGS. 19 to 21, the trigger protrusion 311 is arranged on the surface of the turnplate 308 opposite to the sealing member 309;

a surface of the housing 302 is defined with an opening 313, and the detecting member is inserted through the opening 313 and extends towards the surface of the turnplate 308.

The trigger protrusion 311 is integrally formed with the turnplate 308, or is detachably connected to the turnplate 308. The opening 313 is defined on the surface of the housing 302 facing the surface of the turnplate 308 where the trigger protrusion 311 locates, and the detecting member is inserted in the housing 302 through the opening 313 and extends towards the surface of the turnplate 308. Preferably, the control circuit board 312 is arranged on the outer surface of the housing 302 for electrically connecting with the detecting member. The trigger protrusion 311 rotates with the turnplate 308, after the turnplate 308 rotates by a preset angle, the trigger protrusion 311 on the turnplate 308 triggers the detecting member on the housing 302, causing the detecting member to send an electrical signal.

In some embodiments, the detecting member includes a photoelectric switch 314 arranged on the rotation path of the trigger protrusion 311, the trigger protrusion 311 rotates along with the turnplate 308 to leave or enter a detecting area of the photoelectric switch 314; or, the detecting member includes two mechanical buttons 315. The two mechanical buttons 315 are arranged in opposite directions of the rotation path of the trigger protrusion 311. The trigger protrusion 311 rotates along with the turnplate 308 in different directions to respectively contact and press one of the two mechanical buttons 315.

It can select the non-contact photoelectric switch 314 or the contact mechanical button 315 as the detecting member according to an actual need.

Referring to FIGS. 19 and 20, in case the photoelectric switch 314 is selected as the detecting member, the triggering protrusion 311 is located in the detecting region of the photoelectric switch 314, when the triggering protrusion 311 rotates along with the turnplate 308 and reaches a preset position, the triggering protrusion 311 leaves the detecting region of the photoelectric switch 314, such that the photoelectric switch 314 is triggered to send an electrical signal.

Referring to FIG. 21, in case the mechanical buttons 315 are selected as the detecting member, the two mechanical buttons 315 are arranged in opposite directions of the rotation path of the trigger protrusion 311, and the trigger protrusion 311 rotates within the region between the two mechanical buttons 315. When the trigger protrusion 311 rotates along with the turnplate 308 forward and reaches a forward preset position, the trigger protrusion 311 contacts and presses the mechanical button 315 located in the forward direction, thereby triggering the mechanical button 315 to send a detection signal; when the trigger protrusion 311 rotates along with the turnplate 308 backward and reaches a backward preset position, the trigger protrusion 311 contacts and presses the mechanical button 315 located in the backward direction, thereby triggering the mechanical button 315 to send an electric signal.

Of course, in other embodiments, the detecting member can also be a sensor, such as a Hall switch.

Figure 22:
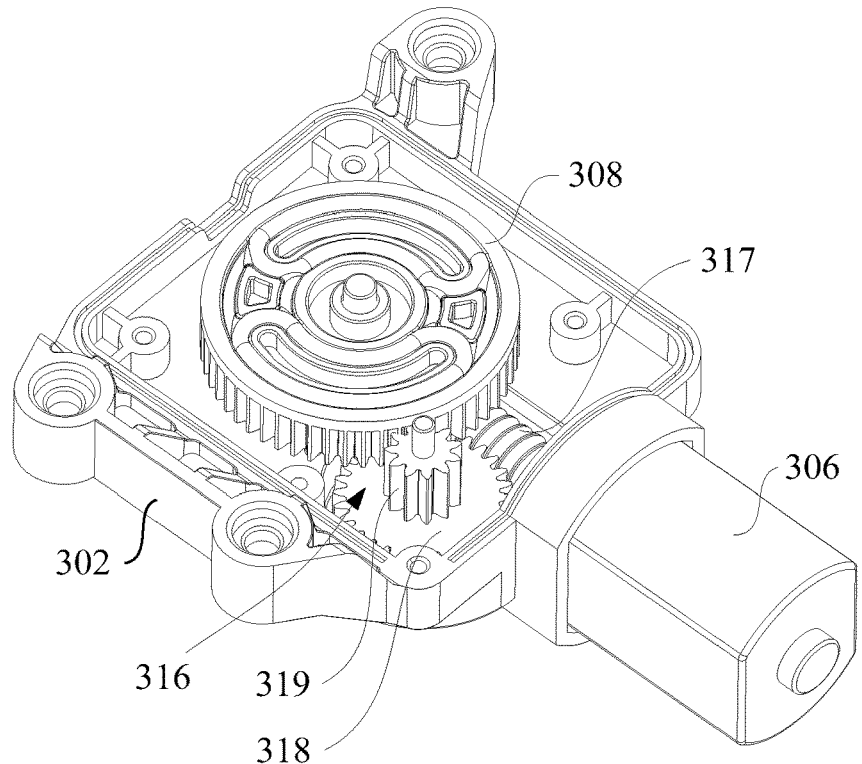
FIG. 22 is a schematic view of an inner structure of the reversing valve according to an exemplary embodiment of the present disclosure.

In some embodiments, referring to FIGS. 18 and 22, the reversing valve 301 further includes:

a transmitting assembly 316. The driving member 306 includes a motor which is connected with the turnplate 308 through the transmitting assembly 316.

The motor is selected as the driving member 306 to transmit power to the turnplate 308 through the transmitting assembly 316. The transmitting assembly 316 may be a one-stage transmitting assembly or a multi-stage transmitting assembly, which may be determined according to actual conditions.

In some embodiments, the transmitting assembly 316 includes a worm 317, the turnplate 308 is a worm gear, and the worm 317 engages with the turnplate 308.

The worm 317 is arranged on an output shaft of the motor. During the motor works, the worm 317 rotates along with the output shaft to engage with the turnplate 308 to drive the turnplate 308 to rotate.

In some other embodiments, as shown in FIG. 22, the transmitting assembly 316 includes a worm 317, a worm gear 318, and a transmission gear 319 coaxially connected with the worm gear 308. The turnplate 308 is defined with gears, the worm 317 is meshed with the worm gear 318, and the transmission gear 319 is engaged with the turnplate 308. The worm 317 is arranged on an output shaft of the motor, during the motor works, the worm 317 rotates along with the output shaft of the motor to drive the worm gear 318 to rotate; the transmission gear 319 then rotates with the worm gear 318 to drive the turnplate 308 to rotate.

In some embodiments, the at least four gas holes 303 are all located on a same side of the housing 302; or, the at least four gas holes 303 are located on opposite two sides of the housing 302.

Figure 23:
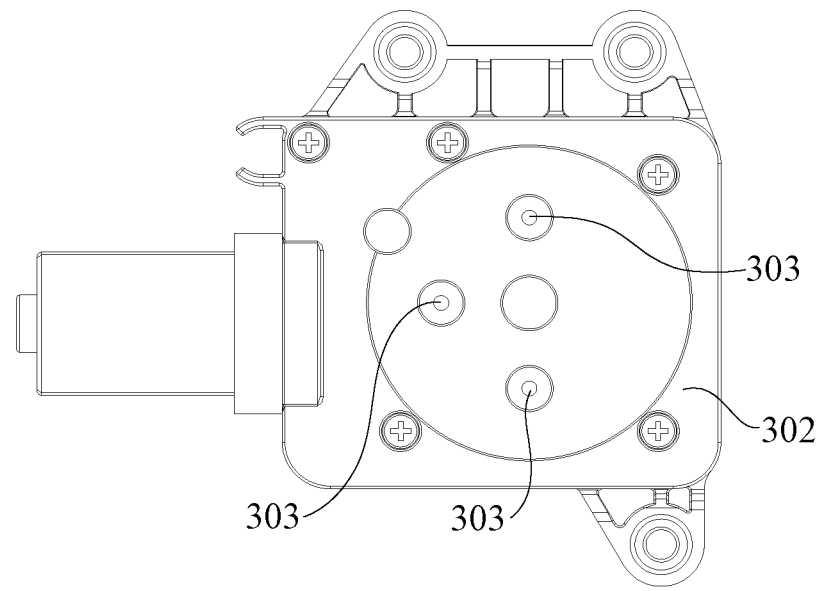
FIG. 23 is a schematic diagram of the reversing valve under one view according to an exemplary embodiment of the present disclosure.
Figure 24:
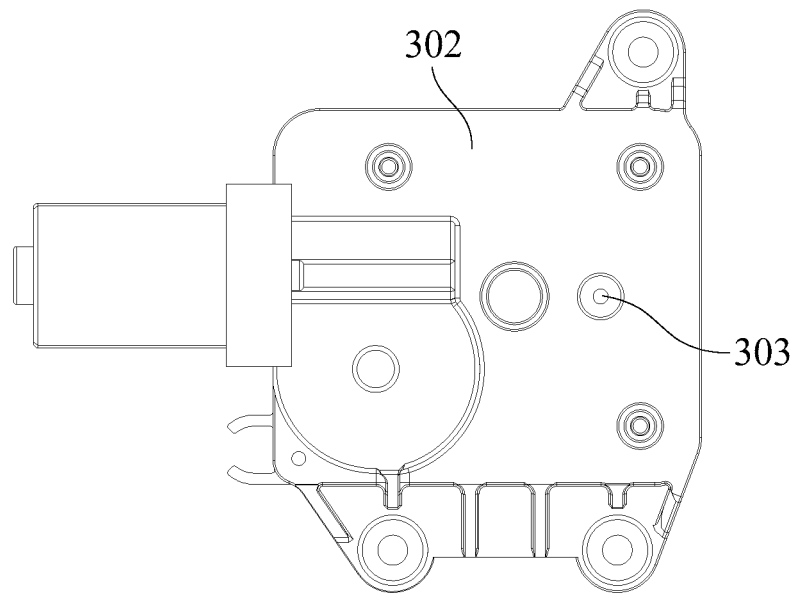
FIG. 24 is a schematic diagram of the reversing valve under another view according to an exemplary embodiment of the present disclosure.

The gas holes 303 can be arranged as any one of the way described above according to actual situation. As shown in FIG. 17, there are four gas holes 303 which are all arranged on a same side of the housing 302, such an arrangement may facilitate other components (such as detecting members, control circuit boards, etc.) to be arranged on an opposite side of the housing 302, and the channel 305 of the turnplate 308 and components inside the housing 302 can be simplified, which is beneficial to avoid a complex structure. As shown in FIG. 23 and FIG. 24, there are four gas holes 303, one of the four gas holes 303 is arranged on one side of the housing 302, and the other three gas holes 303 are located on an opposite side of the housing 302, that is, the gas holes 303 are "3+1" layout. Alternatively, two of the four gas holes 303 may be located on one side of the housing 302, and the other two gas holes 303 may be located on an opposite side of the housing 302, that is, the gas holes 303 are "2+2" layout.

The present application also provides a base station, including a base station body and the reversing valve 301 described in the foregoing embodiments. The base station body is provided with a water tank 320 and a pump 321, and the water tank 320 has a vent port 322 and a water guiding port 323;

the reversing member 304 has a first channel and a second channel. The housing 302 has a first gas hole 303A communicated with an output end of the pump body 321, a second gas hole 303B communicated with an input end of the pump body 321, a third gas hole 303C communicated with the vent port, and a fourth gas hole 303D communicated to the atmospheric environment;

wherein, in case the first channel, the first gas hole 303A, and the fourth gas hole 303D are communicated, and the second channel, the second gas hole 303B, and the third gas hole 303C are communicated, a negative pressure will be formed inside the water tank 320, such that water can be stored in the water tank 320 through the water guiding port 323;

in case the first channel, the first gas hole 303A, and the third gas hole 303C are communicated, and the second channel, the second gas hole 303B, and the fourth gas hole 303D are communicated, a positive pressure will be formed inside the water tank 320, such that water can be discharged from the water tank 320 through the water guiding port 323.

The structure of the reversing valve 301 has been described in the above-mentioned embodiments. Since the base station of the cleaning system includes all the technical solutions of the above-mentioned embodiments, it has at least all the technical effects brought by the technical solutions of the above-mentioned embodiments, which is not repeated here.

In some embodiments, the first gas hole 303A of the reversing valve 301 is connected with a positive pressure gas inlet pipe, and the positive pressure gas inlet pipe is communicated with the output end of the pump 321; the second gas hole 303B is connected with a negative pressure suction pipe, and the negative pressure suction pipe is communicated with the input end of the pump 321; the third gas hole 303C is connected with a vent pipe, and the vent pipe is communicated with the vent port 322 of the water tank 320; the fourth gas hole 303D is connected with an exhaust pipe, and the exhaust pipe is communicated to the atmospheric environment.

Figure 25:
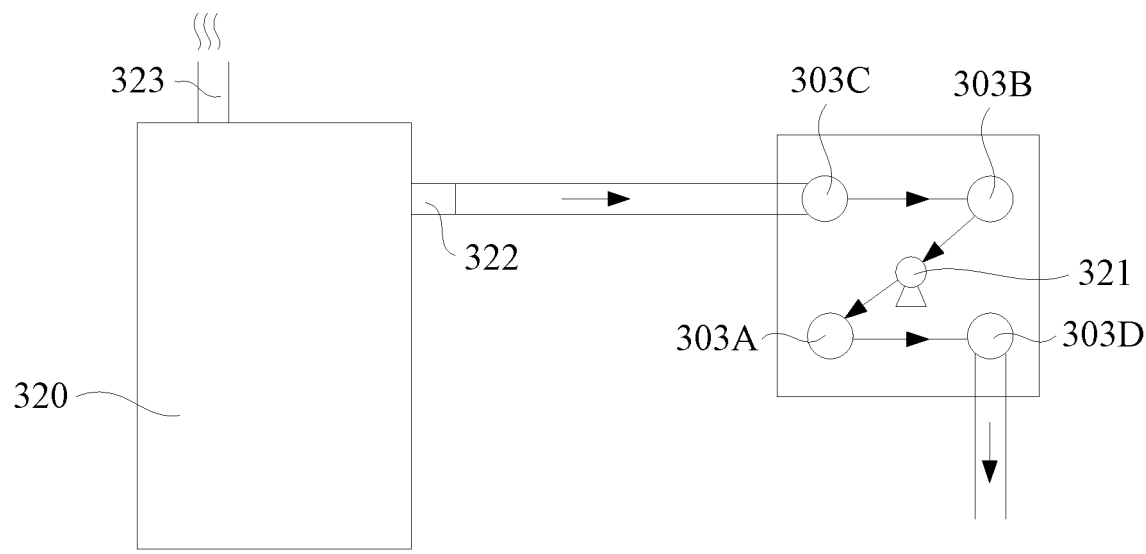
FIG. 25 is a water suck schematic diagram of the water tank applied with the reversing valve according to an exemplary embodiment of the present disclosure.

The gas circuit can be switched by the control of the reversing valve 301. Referring to FIG. 25, in case the first channel, the first gas hole 303A, and the fourth gas hole 303D are communicated (that is, the positive pressure gas inlet pipe is communicated with the exhaust pipe), and the second channel, the second gas hole 303B, and the third gas hole 303C are communicated (namely, the negative pressure suction pipe is communicated with the vent pipe), gas in the water tank 320 will enter the negative pressure suction pipe through the vent pipe and the reversing valve 301 successively, then enter the positive pressure gas inlet pipe through the pump 321, and then enter the atmospheric environment through the reversing valve 301 and the exhaust pipe successively; simultaneously, a negative pressure is generated inside the water tank 320, so that water can be inputted to the water tank 320 through the water guiding port 323. The arrow direction indicates the direction of gas flow.

Figure 26:
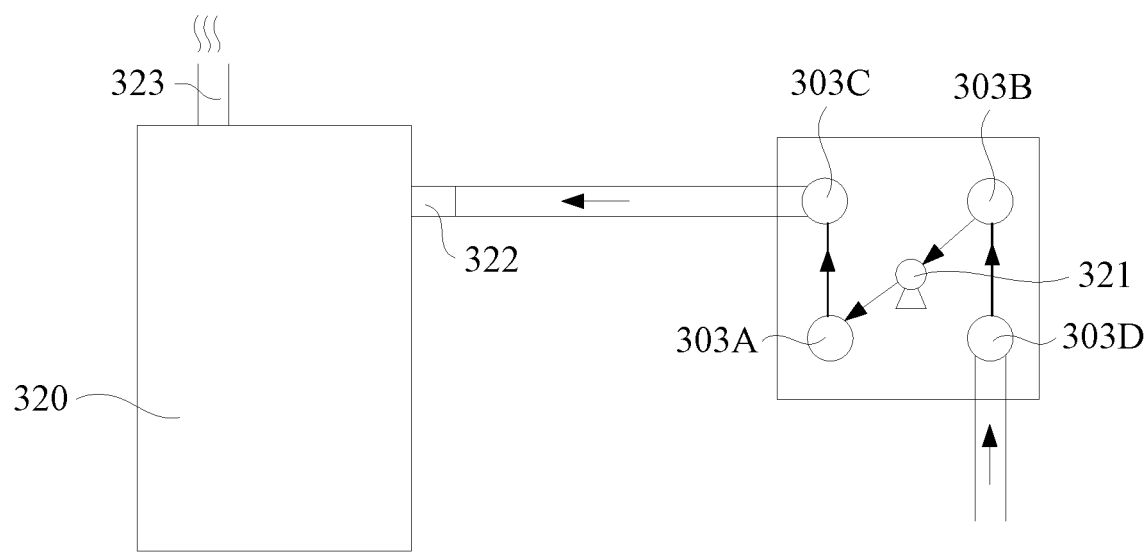
FIG. 26 is a drainage schematic diagram of the water tank applied with the reversing valve according to an exemplary embodiment of the present disclosure.

Referring to FIG. 26, when the first channel, the first gas hole 303A, and the third gas hole 303C are communicated (that is, the positive pressure gas inlet pipe is in communication with the vent pipe), and the second channel, the second gas hole 303B, and the fourth gas hole 303D are communicated (that is, the negative pressure suction pipe is communicated with the exhaust pipe), gas in the atmospheric environment will enter the negative pressure suction pipe through the exhaust pipe and the reversing valve 301 successively, then enter the positive pressure gas inlet pipe through the pump 321, and then enter the water tank through the reversing valve 301 and the vent pipe successively; at the same time, a positive pressure is generated inside the water tank 320, so that water can be discharged from the water tank 320 through the water guiding port 323. The arrow direction indicates the direction of gas flow.

The present application also provides a cleaning system, which includes the base station and the cleaning apparatus described in the foregoing embodiments. The structure of the base station has been described in the foregoing embodiments, since the cleaning system includes all the technical solutions of the foregoing embodiments, it has at least the above-mentioned technical effects brought by the technical solutions of the embodiments, which is not repeated here.

Without conflicting with each other, those skilled in the art can combine the different embodiments or examples described in the specification, or combine the features of the different embodiments or examples.

What has been disclosed above is only a preferred embodiment of the present disclosure, which is to facilitate the understanding and implementation by those skilled in the art rather than to limit the scope of the present disclosure. Therefore, any equivalent changes made based on the disclosure still fall within the scope of the disclosure.

What is claimed is:

1. A pumping and drainage system, wherein the pumping and drainage system comprises:
a first water tank, the first water tank is defined with a water storage cavity and a vent communicated with the water storage cavity;
a gas source system communicated with the vent;
in case the gas source system is in a first state, gas in the water storage cavity is discharged through the vent and the gas source system successively, causing the water storage cavity to be in a negative pressure state, allowing fluid to be sucked into the water storage cavity; in case the gas source system is in a second state, gas is delivered to the water storage cavity by the gas source system through the vent, causing the water storage cavity to be in a positive pressure state, allowing fluid in the water storage cavity to be discharged.

2. The pumping and drainage system as claimed in claim 1, wherein the gas source system comprises:
a gas pump;
a reversing valve, the reversing valve is communicated with the gas pump and the vent respectively, and comprises a reversing member which is capable of moving between a first position and a second position;
in case the reversing member is at the first position, gas in the water storage cavity is discharged through the vent, the reversing valve, and the gas pump successively, causing the water storage cavity to be in the negative pressure state;
in case the reversing member is at the second position, external gas is inputted into the water storage cavity through the reversing valve, the gas pump, and the vent successively, causing the water storage cavity to be in the positive pressure state.

3. The pumping and drainage system as claimed in claim 2, wherein the first water tank comprises:
a first tank body defined with an accommodating cavity;
a second tank body arranged in the accommodating cavity, the second tank body being defined with the water storage cavity and the vent, and the water storage cavity being configured for accommodating fluid;
wherein the reversing valve is arranged in the accommodating cavity.

4. The pumping and drainage system as claimed in claim 1, wherein the water storage cavity is connected with a water inlet channel and a water outlet channel;
a first controlling member is arranged at the water inlet channel and configured to be opened during the gas source system is in the first state and to be closed during the gas source system is in the second state; and
a second controlling member is arranged at the water outlet channel and configured to be closed during the gas source system is in the first state and to be opened during the gas source system is in the second state.

5. The pumping and drainage system as claimed in claim 4, wherein
the first controlling member is a one-way valve or a globe valve; and/or
the second controlling member is a one-way valve or a globe valve.

6. The pumping and drainage system as claimed in claim 4, wherein
the pumping and drainage system comprises a flexible water inlet pipe, the water inlet channel is defined in the flexible water inlet pipe, and the first controlling member is configured to control radial contraction or relaxation of the flexible water inlet pipe to close or open the water inlet channel; and/or
the pumping and drainage system comprises a flexible water outlet pipe, the water outlet channel is defined in the flexible water outlet pipe, and the second controlling member is configured to control radial contraction or relaxation of the flexible water outlet pipe to close or open the water outlet channel.

7. A base station, wherein the base station comprises: a base station body; and a pumping and drainage system; wherein the pumping and drainage system comprises:
a first water tank configured to be installed on the base station body, the first water tank being defined with a water storage cavity and a vent communicated with the water storage cavity; and
a gas source system;
in case the first water tank is installed on the base station body, the gas source system is communicated with the vent of the first water tank;
in case the gas source system is in a first state, gas in the water storage cavity is discharged through the vent and the gas source system successively, causing the water storage cavity to be in a negative pressure state, allowing fluid to be sucked into the water storage cavity; in case the gas source system is in a second state, gas is delivered to the water storage cavity by the gas source system through the vent, causing the water storage cavity to be in a positive pressure state, allowing fluid in the water storage cavity to be discharged.

8. The base station as claimed in claim 7, wherein the gas source system comprises a gas pump and a reversing valve communicated with the gas pump and the vent of the first water tank, the gas pump and the reversing valve are both arranged on the base station body, and the base station body is provided with at least one interface;
the vent is communicated with the reversing valve through the interface;
the reversing valve is configured to switch the communication at the interface to form a negative pressure gas circuit or a positive pressure gas circuit in case the negative pressure gas circuit is formed, gas in the water storage cavity is allowed to flow into the gas pump through the interface, the reversing valve, and a gas inlet of the gas pump successively to cause the water storage cavity to be in the negative pressure state; and
in case the positive pressure gas circuit is formed, gas is allowed to flow into the interface through a gas outlet of the gas pump and the reversing valve successively to cause the water storage cavity to be in the positive pressure state.

9. The base station as claimed in claim 7, wherein the gas source system comprises a gas pump and a reversing valve communicated with the gas pump and the vent of the first water tank, the reversing valve is arranged in the first water tank, and the gas pump is arranged on the base station body;
the base station body is provided with at least two interfaces, one interface forms a positive pressure interface and the other interface forms a negative pressure interface;
in case the first water tank is installed on the base station body, the positive pressure interface is communicated with the reversing valve and a gas outlet of the gas pump, and the negative pressure interface is communicated with the reversing valve and a gas inlet of the gas pump;
the reversing valve is configured to switch to communicate with the positive pressure interface or to communicate with the negative pressure interface; in case the reversing valve is communicated with the negative pressure interface, gas in the water storage cavity is allowed to flow into the gas pump through the negative pressure interface and the gas inlet of the gas pump to cause the water storage cavity to be in the negative pressure state; and in case the reversing valve is communicated with the positive pressure interface, gas is allowed to flow into the positive pressure interface from the gas outlet of the gas pump to cause the water storage cavity to be in the positive pressure state.

10. The base station as claimed in claim 9, wherein the first water tank has a water inlet and a water outlet both communicated with the water storage cavity, the reversing valve is respectively connected to the negative pressure interface, the positive pressure interface, the vent, and atmospheric environment;
wherein when the negative pressure interface, the reversing valve and the vent are communicated, and the positive pressure interface and the reversing valve are communicated to the atmospheric environment, negative pressure is formed inside the water storage cavity of the first water tank for the water storage cavity of the first water tank to store water through the water inlet;
when the positive pressure interface, the reversing valve and the vent are communicated, and the negative pressure interface and the reversing valve are communicated to the atmospheric environment, positive pressure is formed inside the water storage cavity of the first water tank for the water storage cavity of the first water tank to discharge water through the water outlet.

11. The base station as claimed in claim 9, wherein the base station further comprises a second water tank,
the base station body is configured to be installed with either the first water tank or the second water tank;
the positive pressure interface is provided with a gas inlet that communicates with the gas outlet of the gas pump, and a docking port for docking with the first water tank, and the gas inlet is communicated with the docking port;
when the first water tank is installed on the base station body, the negative pressure interface is communicated with the first water tank, and the docking port of the positive pressure interface is in an open state to connect and communicate with the first water tank;
when the second water tank is installed on the base station body, the negative pressure interface is communicated with the second water tank, and the positive pressure interface is communicated to atmosphere.

12. The base station as claimed in claim 11, wherein when the second water tank is installed on the base station body, the docking port of the positive pressure interface is in a closed state.

13. The base station as claimed in claim 12, wherein the positive pressure interface is further provided with an exhaust port communicated with the gas inlet;
when the first water tank is installed on the base station body, the exhaust port is in a closed state, and gas from the gas pump enters the first water tank from the gas inlet, the docking port, and the reversing valve;
when the second water tank is installed on the base station body, gas from the gas pump is discharged into atmosphere through the gas inlet and the exhaust port.

14. The base station as claimed in claim 13, wherein the positive pressure interface further comprises a concave portion defined on the base station body, and the concave portion defines a communicating cavity;
the communicating cavity is configured to communicate with the gas inlet, the docking port, and the exhaust port respectively;
in case the second water tank is installed on the base station body, gas from the gas pump first enters the communicating cavity from the gas inlet, and then is discharged into atmosphere through the exhaust port.

15. The base station as claimed in claim 14, wherein the docking port is a concave docking port, the first water tank comprises a protruding gas inlet connector, and the gas inlet connector is capable of being inserted into the concave docking port to communicate with the concave docking port; or
the docking port is a convex docking port, the convex docking port is located in the concave portion, and protrudes upwards from a bottom of the concave portion, the first water tank comprises a convex gas inlet connector, and the convex docking port is capable of being inserted into the gas inlet connector to communicate with the gas inlet connector.

16. The base station as claimed in claim 15, wherein the base station body is further provided with a sealing member, and the sealing member is positioned between the docking port and the gas inlet connector.

17. The base station as claimed in claim 16, wherein
in case the docking port is a concave docking port, the sealing member is sleeved on an outer peripheral wall of the gas inlet connector, and abuts an inner side wall of the concave docking port;
in case the docking port is a convex docking port, the sealing member is arranged on an inner peripheral wall of the gas inlet connector, and abuts an outer side wall of the convex docking port.

18. The base station as claimed in claim 17, wherein
in case the docking port is a concave docking port, the sealing member is provided with annular protrusions protruded on an outer peripheral wall of the sealing member, and the annular protrusions resist against the inner side wall of the concave docking port;
in case the docking port is a convex docking port, the sealing member is provided with annular protrusions protruded on an inner peripheral wall of the sealing member, and the annular protrusions resist against the outer side wall of the convex docking port.

19. The base station as claimed in claim 17, wherein the docking port is a concave docking port, the sealing member is defined with an extending portion; the extending portion is located at an end of the sealing member facing the concave docking port, a deformation cavity is defined between the extending portion and the inner side wall of the concave docking port, and the extending portion deforms towards the deformation cavity when there is gas passing through.

20. A cleaning system, wherein the cleaning system comprises a base station and a cleaning apparatus, and the base station is configured for servicing the cleaning apparatus;

the base station comprises a base station body and a pumping and drainage system, wherein the pumping and drainage system comprises:

a first water tank installed on the base station body, the first water tank is defined with a water storage cavity and a vent communicated with the water storage cavity;

a gas source system communicated with the vent;

in case the gas source system is in a first state, gas in the water storage cavity is discharged through the vent and the gas source system successively, causing the water storage cavity to be in a negative pressure state, allowing fluid to be sucked into the water storage cavity; in case the gas source system is in a second state, gas is delivered to the water storage cavity by the gas source system through the vent, causing the water storage cavity to be in a positive pressure state, allowing fluid in the water storage cavity to be discharged.

* * * * *